United States Patent [19]

MacKenzie

[11] 4,143,396
[45] Mar. 6, 1979

[54] DIGITAL CHROMINANCE SEPARATING AND PROCESSING SYSTEM AND METHOD

[75] Inventor: Robert P. MacKenzie, Menlo Park, Calif.

[73] Assignee: Ampex Corporation, Redwood City, Calif.

[21] Appl. No.: 765,563

[22] Filed: Feb. 4, 1977

Related U.S. Application Data

[63] Continuation of Ser. No. 763,251, Jan. 26, 1977, abandoned.

[51] Int. Cl.² .............................................. H04N 9/00
[52] U.S. Cl. ......................................... 358/8; 358/37; 358/31
[58] Field of Search ................... 358/4, 8, 13, 35, 37, 358/31

[56] References Cited

U.S. PATENT DOCUMENTS 4,007,486  2/1977  Inaba et al. .......................... 358/8 X Primary Examiner—Robert L. Richardson
Attorney, Agent, or Firm—Robert G. Clay; George B. Almeida

[57] ABSTRACT

A digital chrominance separating and processing system which minimizes the effects of the inherent incomplete separation of the chrominance and luminance signals at the color edges of a television picture, when attempting to reproduce both frames of a composite color television signal from a single field or frame. The system digitally conditions the chrominance signal extracted from the available field or frame, by pre-selecting the degree of de-saturation of the chrominance in the reconstituted color frames of the composite color television signal, in the region of the color edges. That is, the degree of chrominance saturation at the color edges is compromised in one reconstituted frame, but is improved in the next frame. To this end, the frequency components of the extracted chrominance are selectively rotated on alternate frames relative to the luminance, whereby upon subsequent summation, the chrominance added back to the luminance in alternate frames has magnitudes which are equal, or near equal, at the regions of the color edges. Thus, the resulting reconstituted composite color television signal does not experience visibly objectionable chrominance fluctuations at the color edges.

32 Claims, 16 Drawing Figures

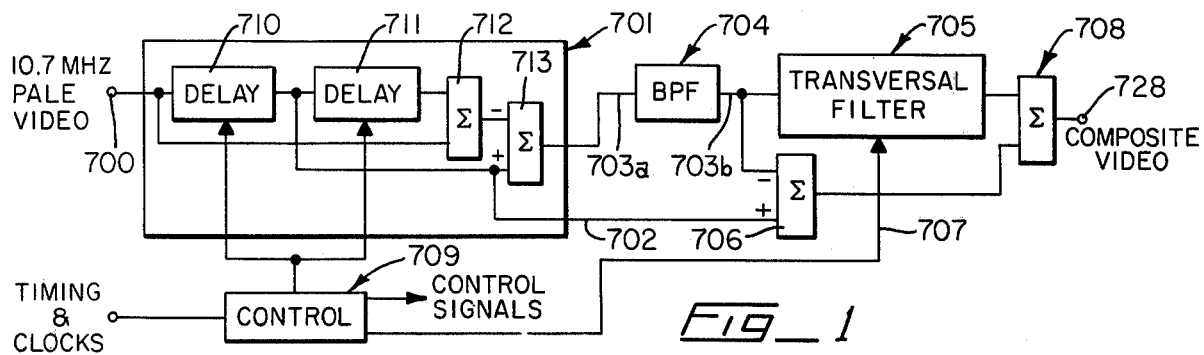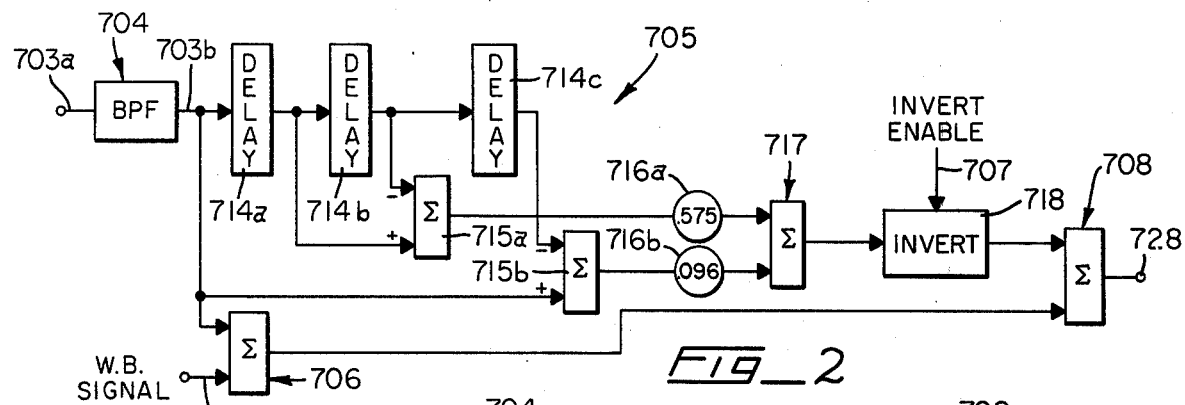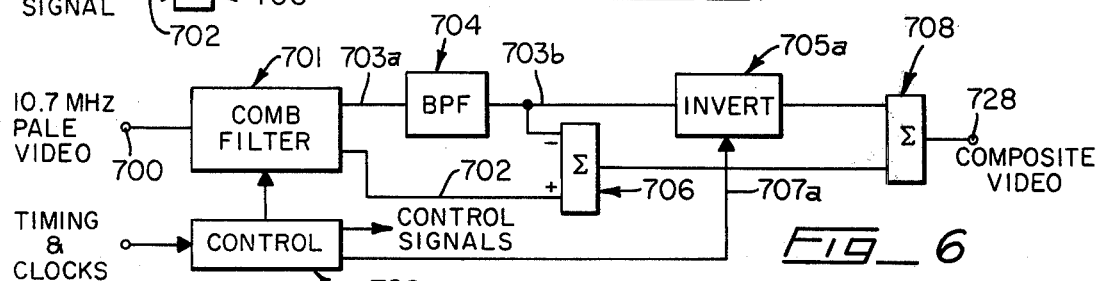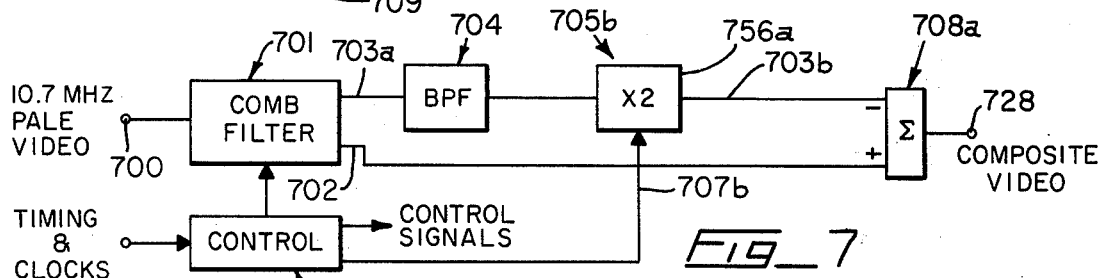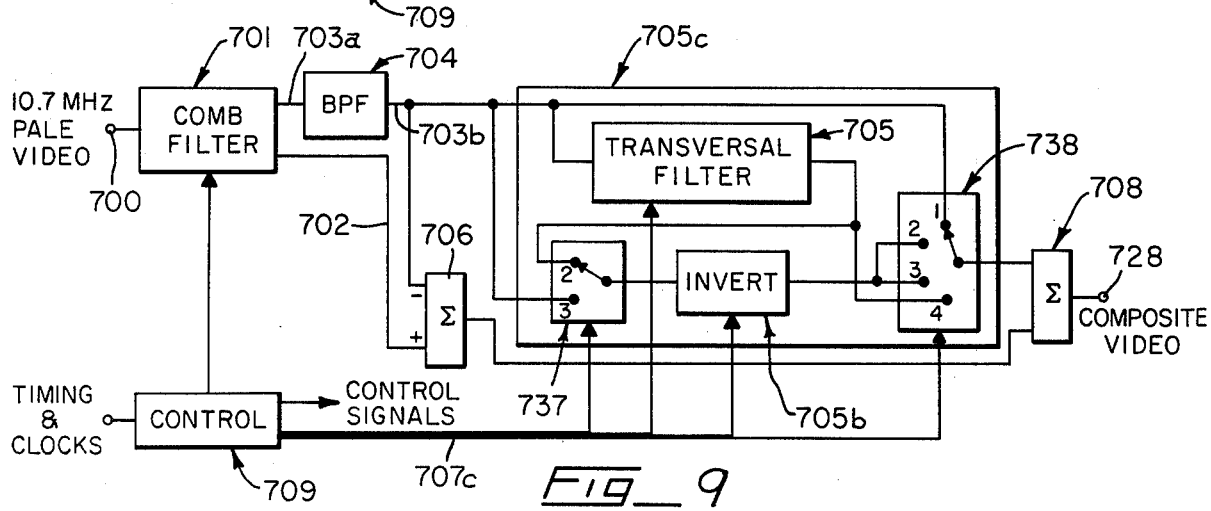

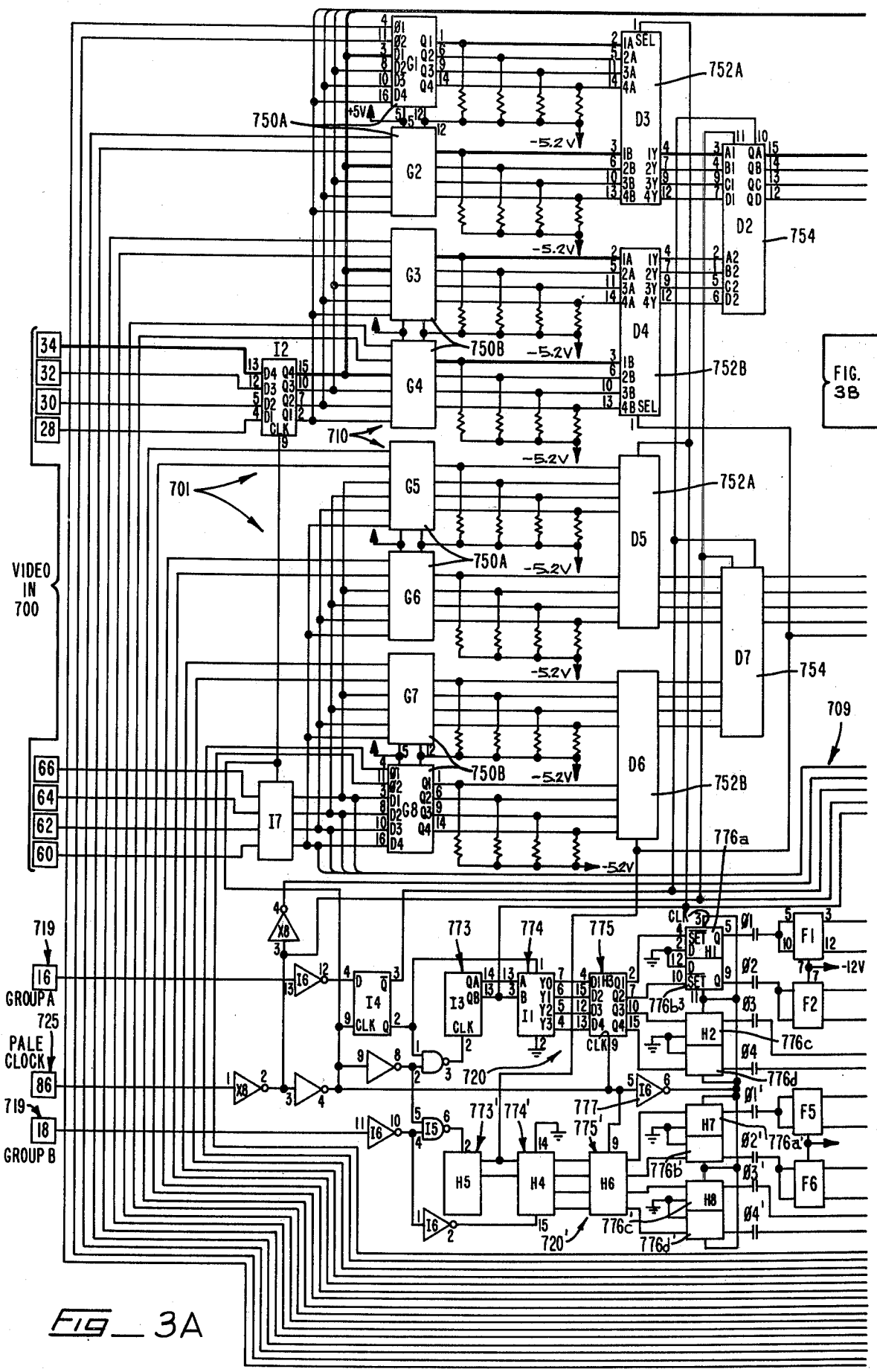
FIG_3A

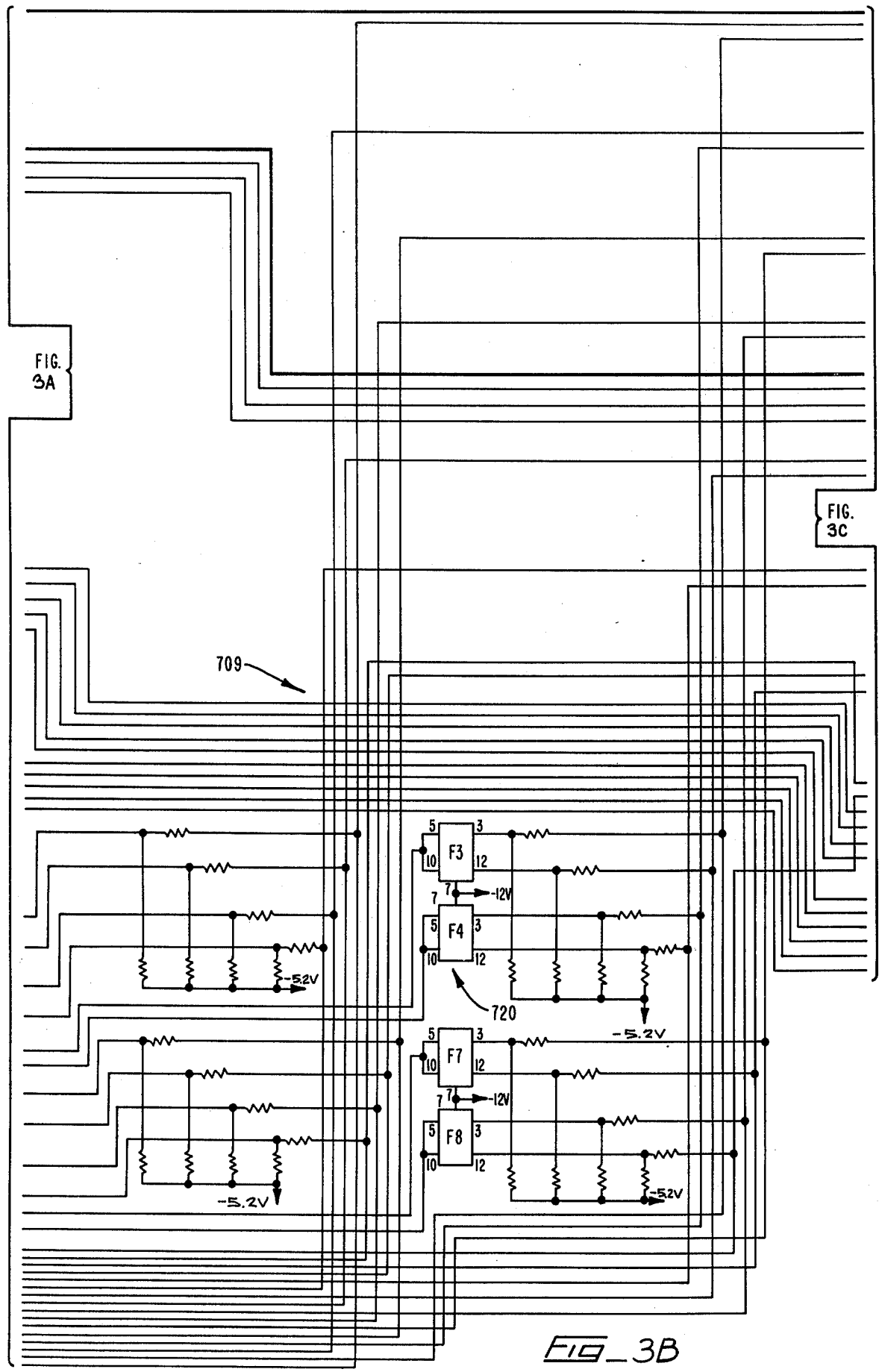

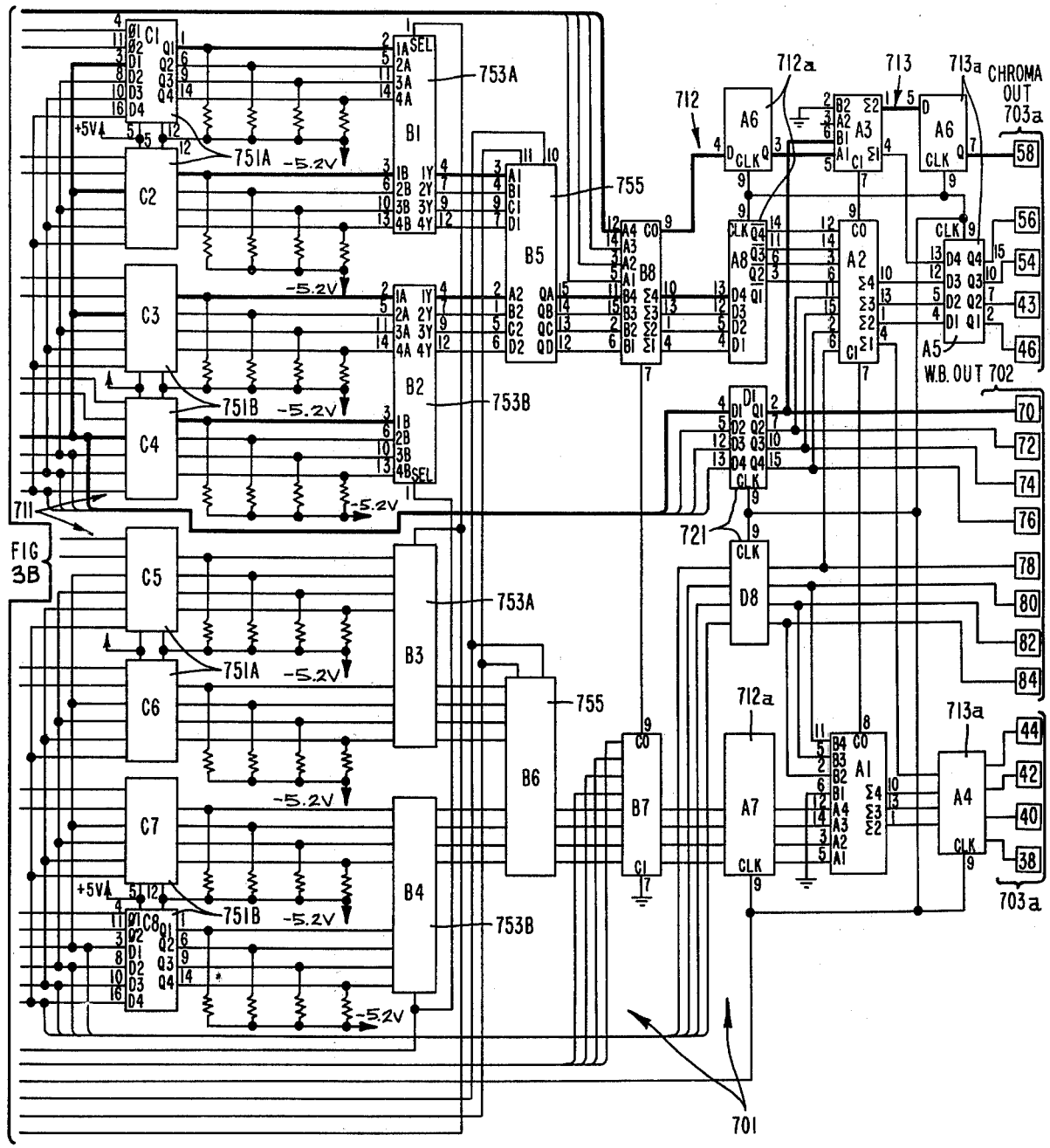
Fig_3C

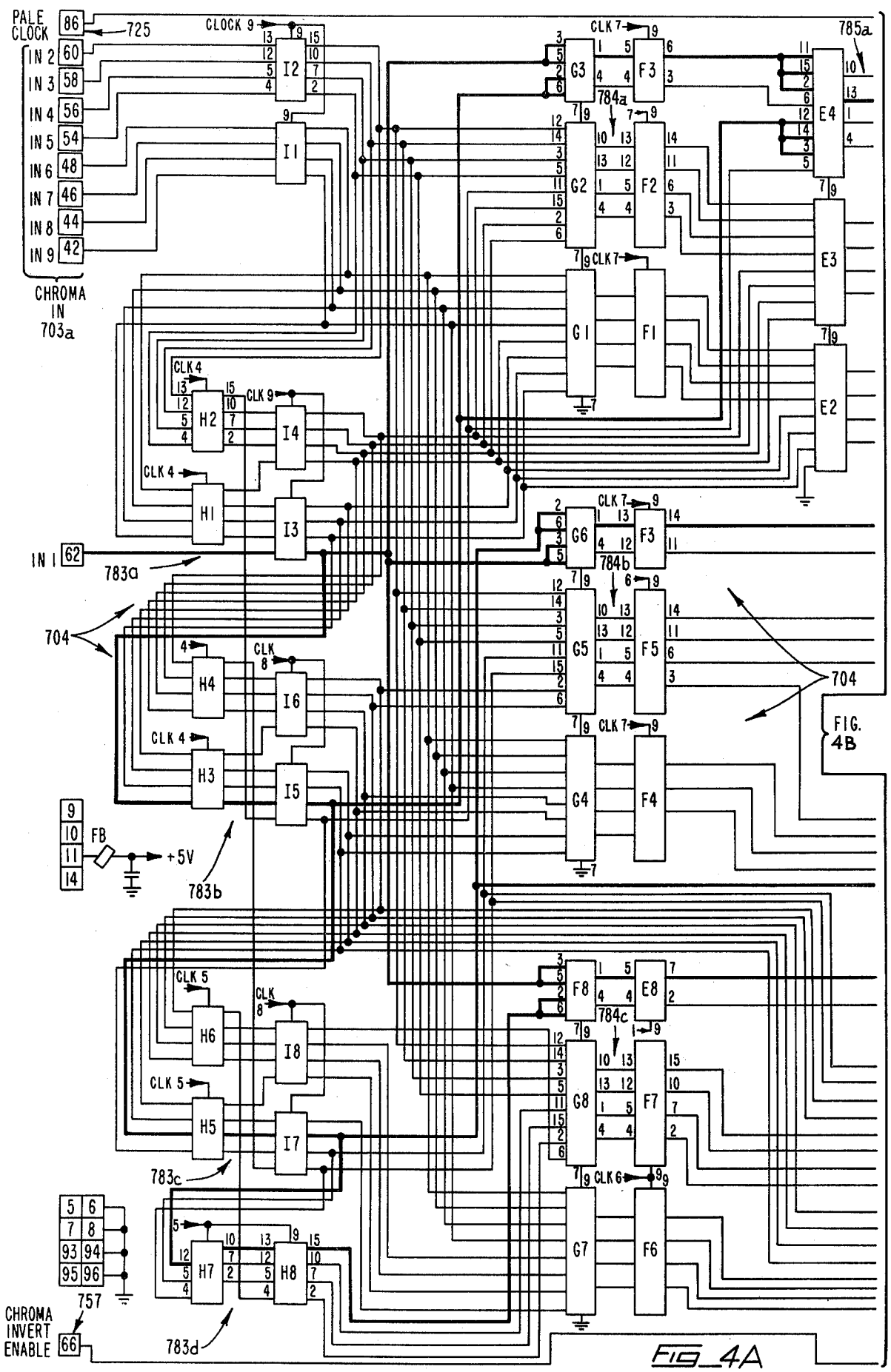
FIG_4A

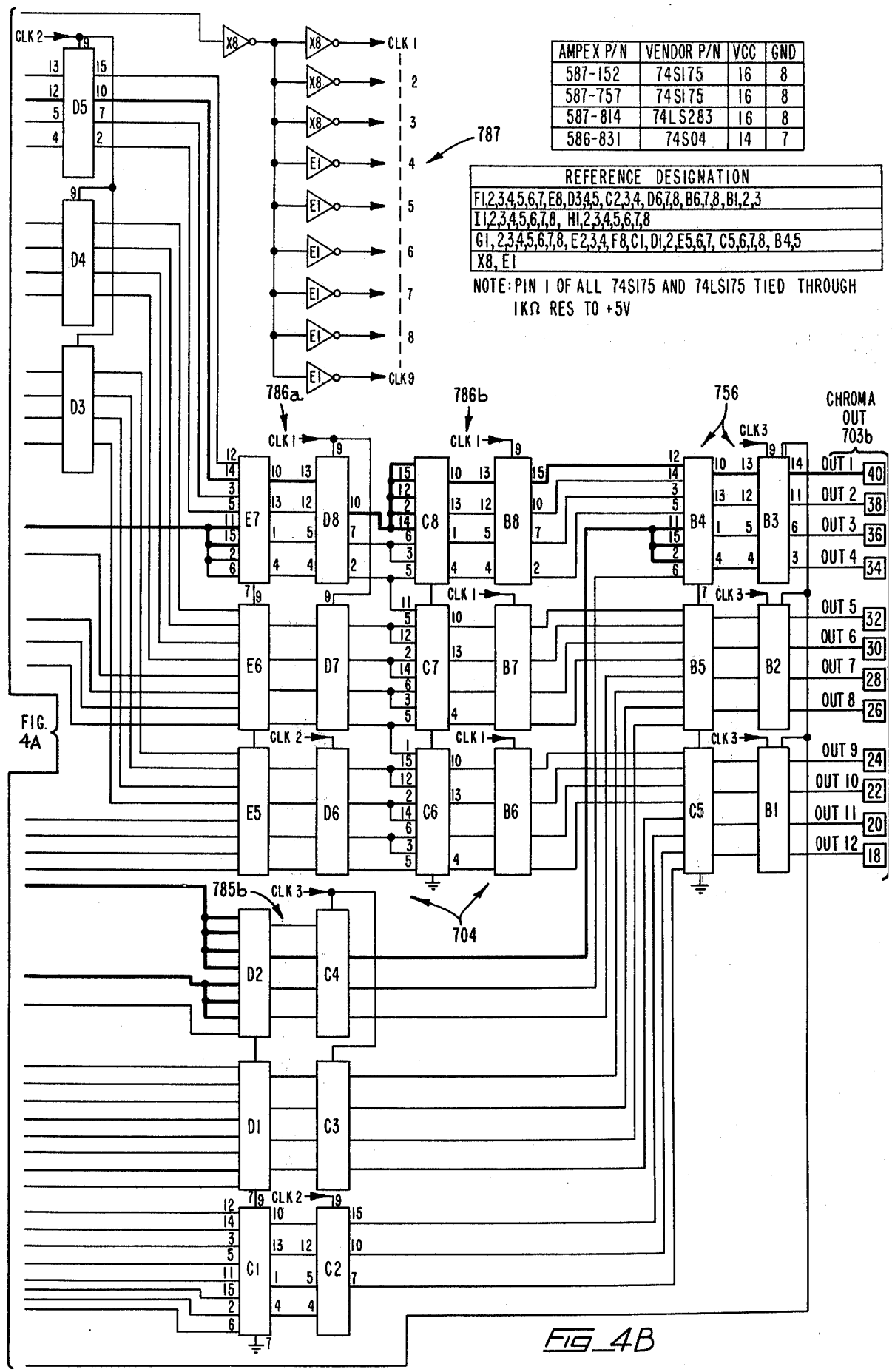
Fig_4B

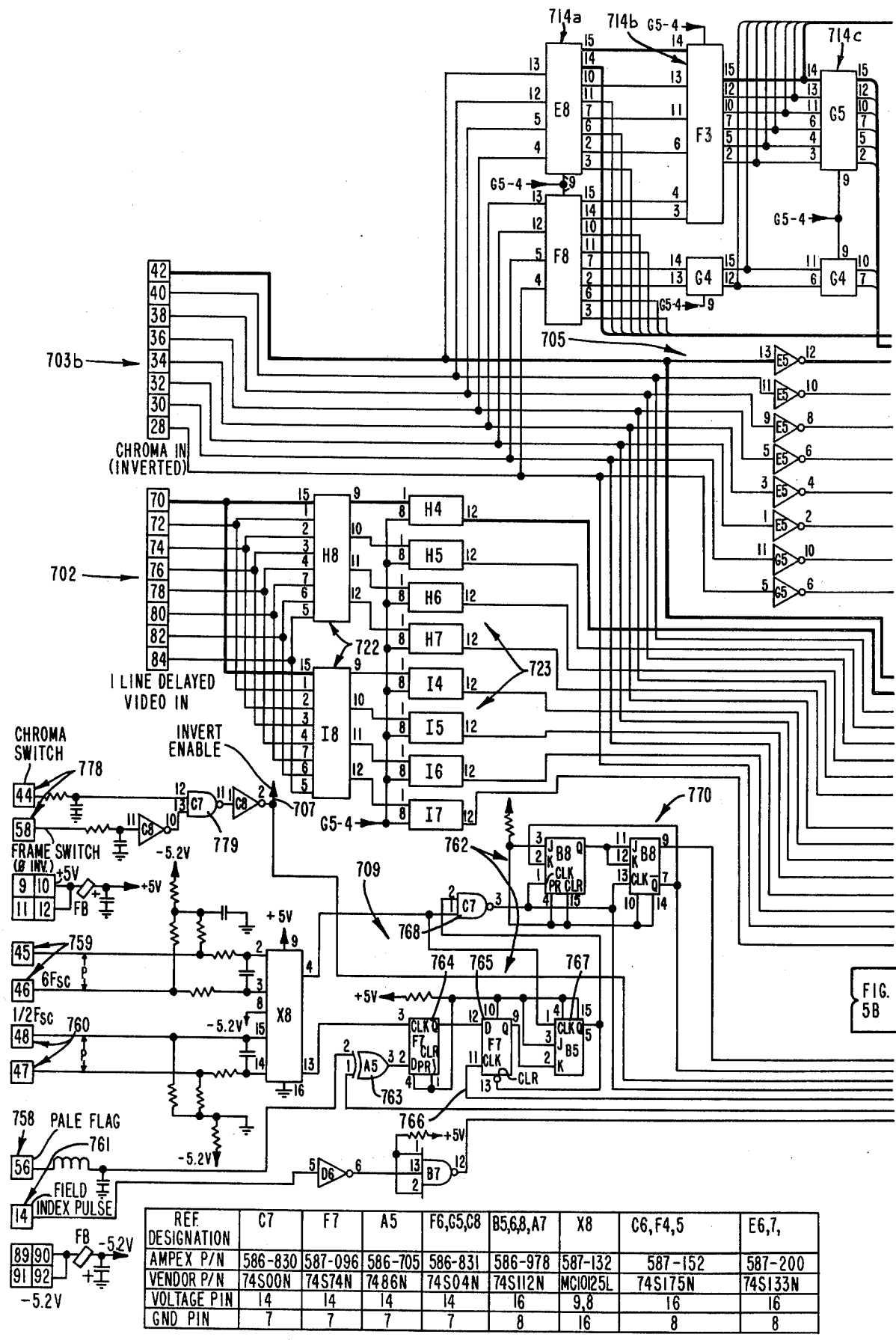
Fig_5A

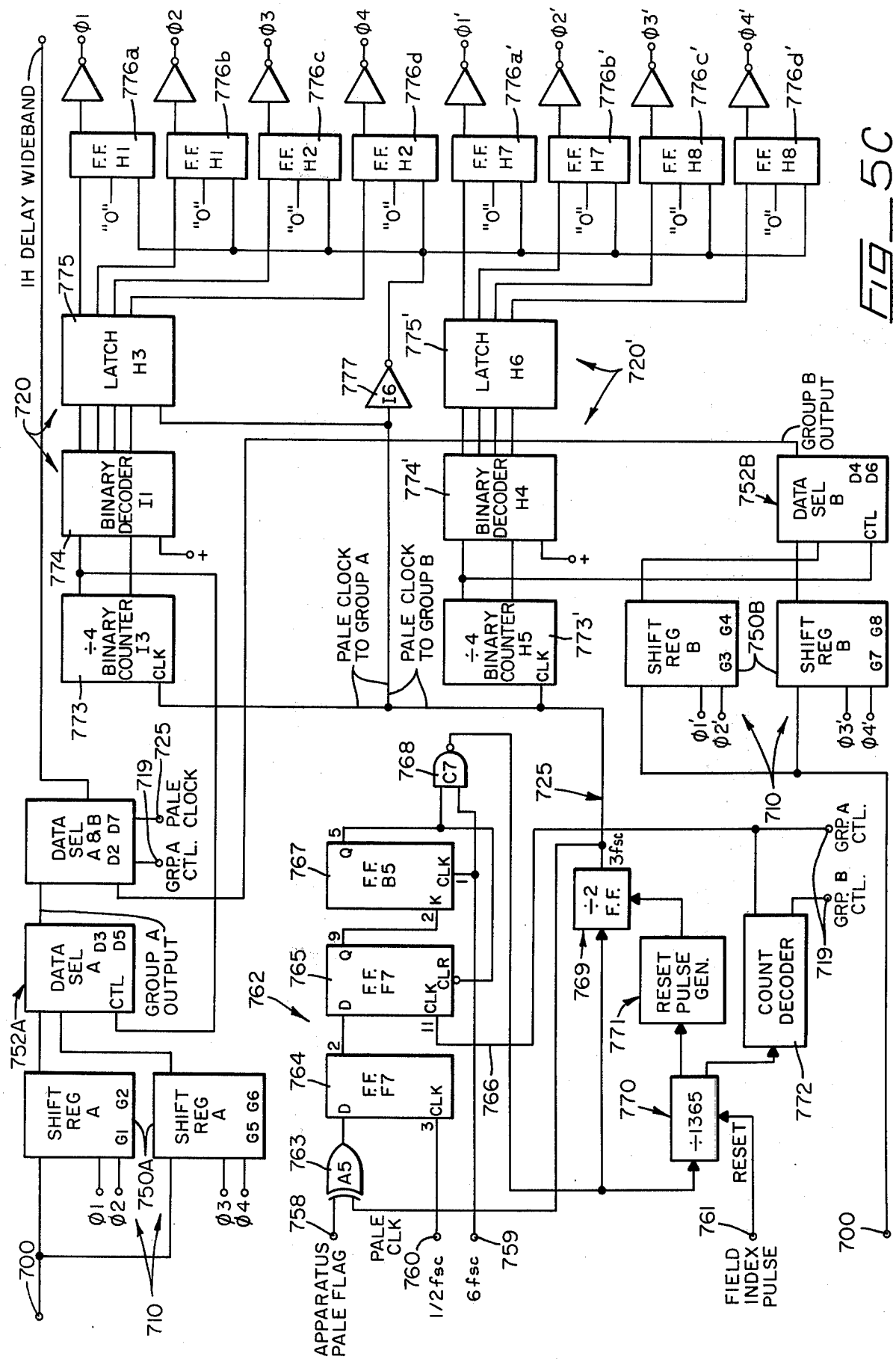

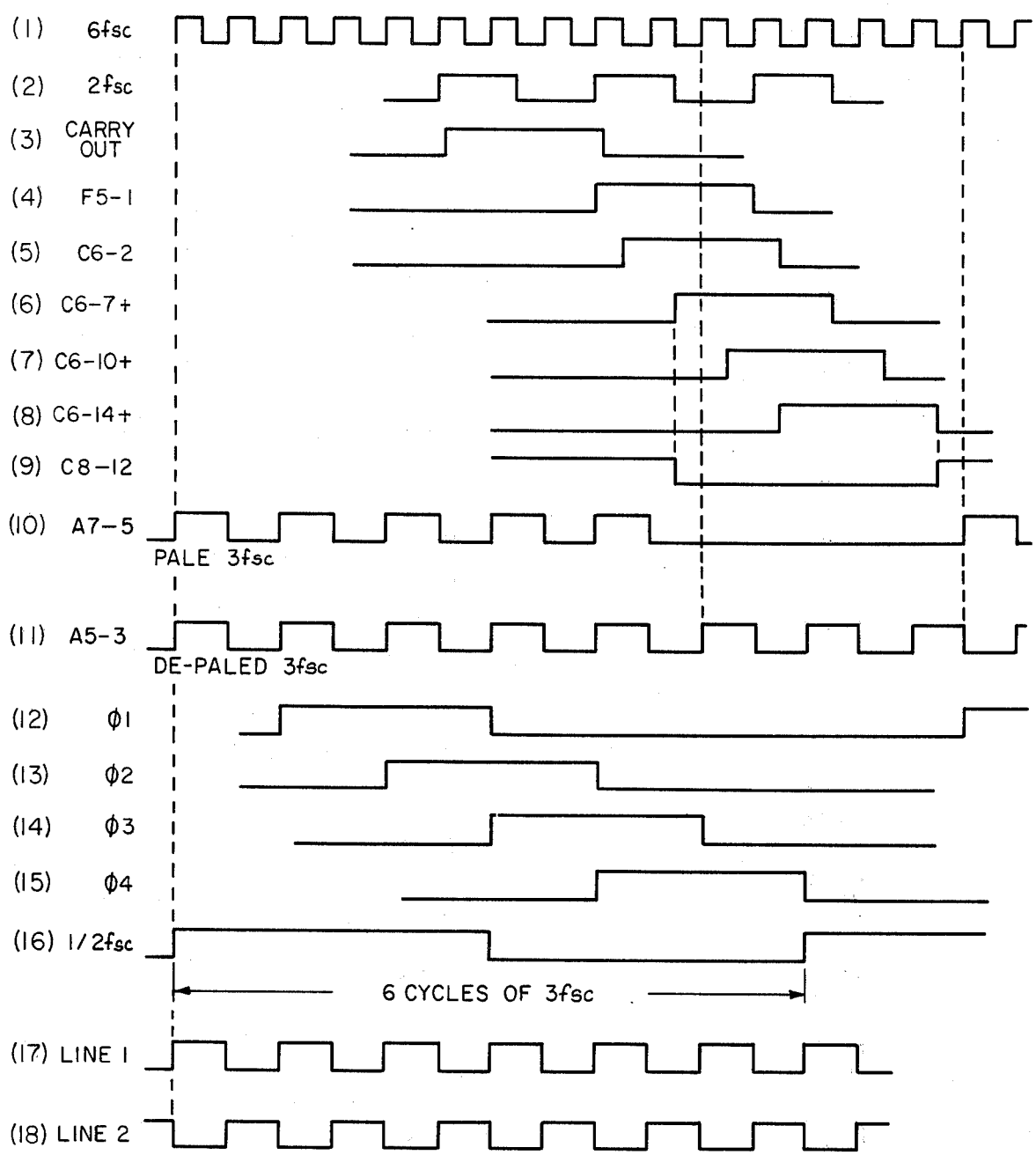
FIG_5D

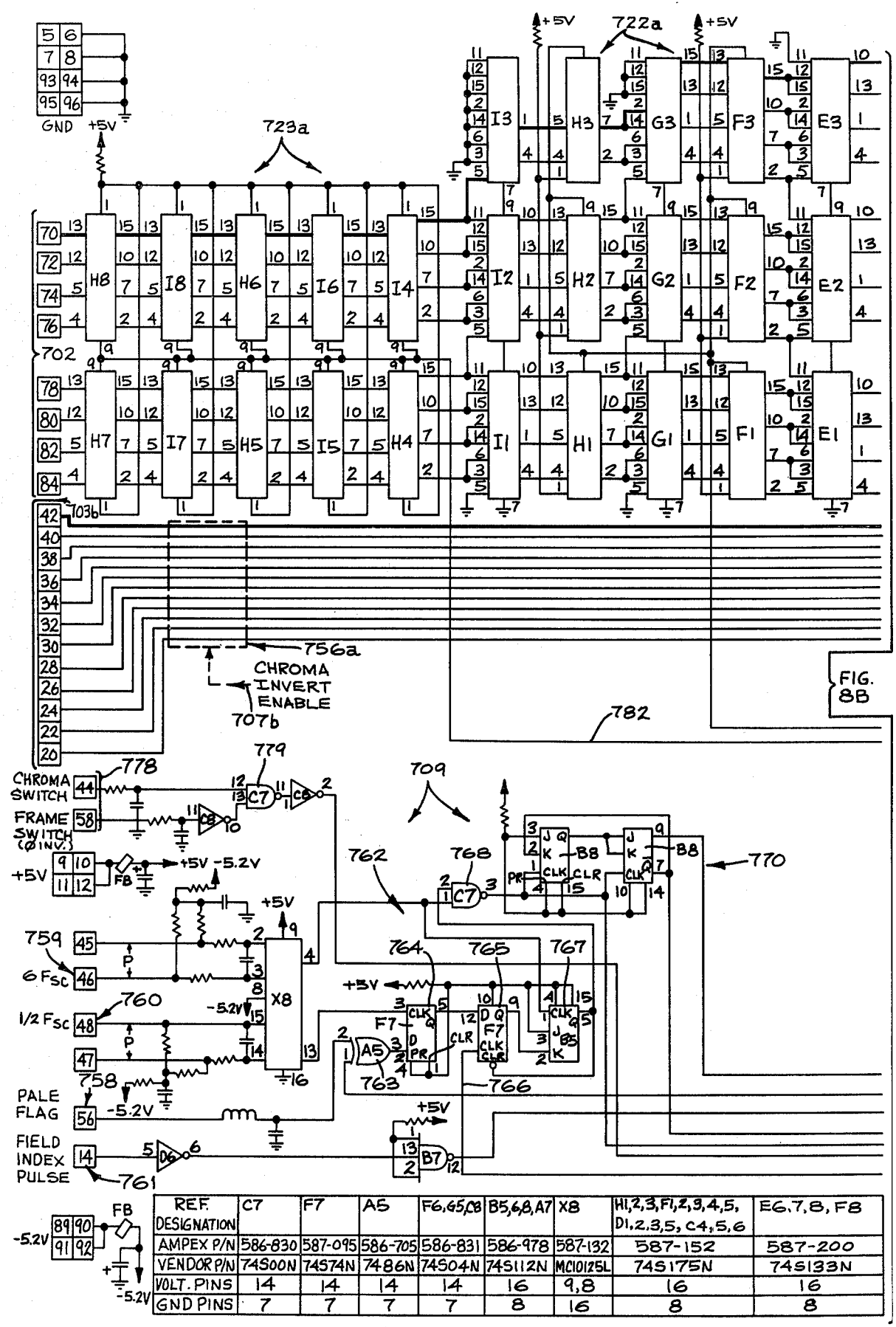
Fig_8A

DIGITAL CHROMINANCE SEPARATING AND PROCESSING SYSTEM AND METHOD

This is a continuation of the application Ser. No. 763,251, filed Jan. 26, 1977 and now abandoned.

BACKGROUND OF THE INVENTION

1. Field

The invention is related to circuits for separating chrominance and luminance signals in color television processing and systems, and particularly to a process and apparatus for precluding visibly objectionable flicker at vertical transitions in a television picture signal, when reproducing both frames of a composite color video signal from only a single color or field.

2. Prior Art

Video storage systems with self-refreshing outputs are available which selectively store color television signals for rapid retrieval. Typical of such systems is the HS-100 color slow-motion recorder/reproducer, manufactured by Ampex Corporation, Redwood City, California. In such system, an NTSC color television signal is generated from a single magnetically stored PCM video field. Various other systems provide the reproduction of a composite color video signal from a single stored frame, wherein "frame" is hereinafter defined as two interlaced fields of a four field color coded NTSC color television signal. Because of the characteristics of the NTSC color television signal, in order to generate a composite television signal from a single stored field or frame, it is necessary to separate the luminance and chrominance signals, invert the chrominance on alternate frames, and then recombine the two signals. The chrominance separation process is generally accomplished utilizing a comb filter and bandpass filter, previously in the analog format, but more recently in the digital format. As is well known, the comb filter takes advantage of the frequency relationships between the horizontal line rate and the color subcarrier signal, and typically utilizes three adjacent television lines in a given field and selectively adds and subtracts them to obtain the separated chrominance and luminance signals.

The disadvantage of the separation process is that at places in the television picture where there are vertical discontinuities, e.g., at color edges, the comb filter inherently does not completely separate the chrominance and luminance signals. At these color edges, a portion of the chrominance is extracted to the chrominance channel, while the remainder of the chrominance is left in the luminance channel. When reproducing the video, chrominance inversion is performed on alternate frames by changing the sign of the signal in the chrominance channel. Subsequent addition of the chrominance to the signal in the luminance channel provides incomplete recovery of the chrominance in the vicinity of the vertical discontinuities. The result is one frame with full chrominance saturation and sharp color edges, followed by an alternate color where vertical discontinuities have de-saturated edges. This cause a readily visible and objectionable 15 Hz flicker in the picture at the color edges.

As previously mentioned, the process of reproducing a composite color television signal from a single field or frame of stored video employs some form of comb filtering, a bandpass filter for removing low frequency chrominance components, and means for performing an inversion of the chrominance component on alternate frames. Various digital comb filters and bandpass filters have recently been made available for providing the chrominance and luminance signal separation. However, the process and apparatus for re-combining the chrominance and luminance through some form of digital inversion, is not presently available. A fully digital system is preferable to provide the desired signal stability and reliability conventionally associated with digital implementation.

In reproducing the composite color television signal from a single field, as in a slow and stop motion recorder/reproducer, the separation, the bandpass filtering and the inversion processes are presently performed via analog implementation. In such systems, it would be very desirable to provide the above processes in a digital format, with digital implementation.

SUMMARY OF THE INVENTION

The invention combination overcomes the above-noted shortcomings of the prior art by providing an all-digital system of associated stability and reliability, which also minimizes or cancels entirely the visible flicker along the color edges of a television picture reproduced from a single frame or single field. To this end, the invention provides various embodiments wherein pre-selected degrees of de-saturation in the color frames is generated at those color edges in the picture where the comb filter fails to effect a complete separation of luminance and chrominance signals.

Accordingly, a digital comb filter in combination with a digital bandpass filter provide means for generating a separation of the chrominance and luminance signals, while further providing a one-horizontal-line (1H) delayed wideband television signal. Means for performing a digital inversion process are coupled to the chrominance signal and are adapted to digitally condition the extracted chrominance to provide a selected degree of de-saturation during alternate repetitive reproductions at the field or frame rate, at those color edges of the picture where the comb filter fails to effect a complete separation of luminance and chrominance. Digital re-combining means is coupled to the inversion means, and to the luminance signal or to the wideband signal, to digitally reconstitute the repetitive reproductions.

In one embodiment, the inversion means of previous mention comprises a digital transversal filter with odd symmetry, which selectively rotates the phase of the chrominance component with relation to the luminance component, to provide a compromise in the degree of de-saturation of chrominance in both color frames at those color edges where incomplete separation is effected. In another embodiment the digital inversion process is performed on the extracted chrominance, which is then digitally re-combined with a 1H delayed wideband signal to provide the composite color television signal.

The foregoing specific embodiments of the invention were designed for use in conjunction with an overall television storage apparatus which is the subject matter of a U.S. application entitled "Video Frame Storage Recording and Reproducing Apparatus", by J. P. Diermann and T. W. Ritchey, Ser. No. 763,371 filed on Jan. 28, 1977, and assigned to a common assignee.

Thus, an object of the invention is to partially, and selectively, de-saturate the chrominance signal in the frames to minimize or delete the visible flicker at vertical discontinuities where the comb filter inherently fails to completely separate chrominance and luminance.

Another object of the invention inter alia is to provide chrominance processing, including the inversion process, with an all-digial implementation.

BRIEF DESCRIPTION OF THE DRAWINGS

FIG. 1 is a block diagram of one embodiment of the chrominance separating and processing system wherein the chrominance inversion means comprises a digital transversal filter with odd symmetry.

FIG. 2 is a block diagram showing in greater detail the chrominance inversion means of FIG. 1.

FIGS. 3A-C, 4A-B and 5A-B are schematic diagrams of the system of FIGS. 1 and 2 depicting one digital implementation thereof, by way of example only.

FIGS. 5C-D are a block diagram and timing diagram respectively, depicting the timing control means employed with the filter means of the various embodiments.

FIGS. 6 and 7 are block diagrams of alternative embodiments of the chrominance separating and processing system.

FIGS. 8A-B are schematic diagrams of one digital implementation of the inversion means and control means therefor of FIG. 7.

FIG. 9 is a block diagram of an alternative embodiment of the chrominance separating and processing system employed to reconstitute the four fields of a composite color television signal from a single stored field.

DESCRIPTION OF THE PREFERRED EMBODIMENTS

Figure 5B:
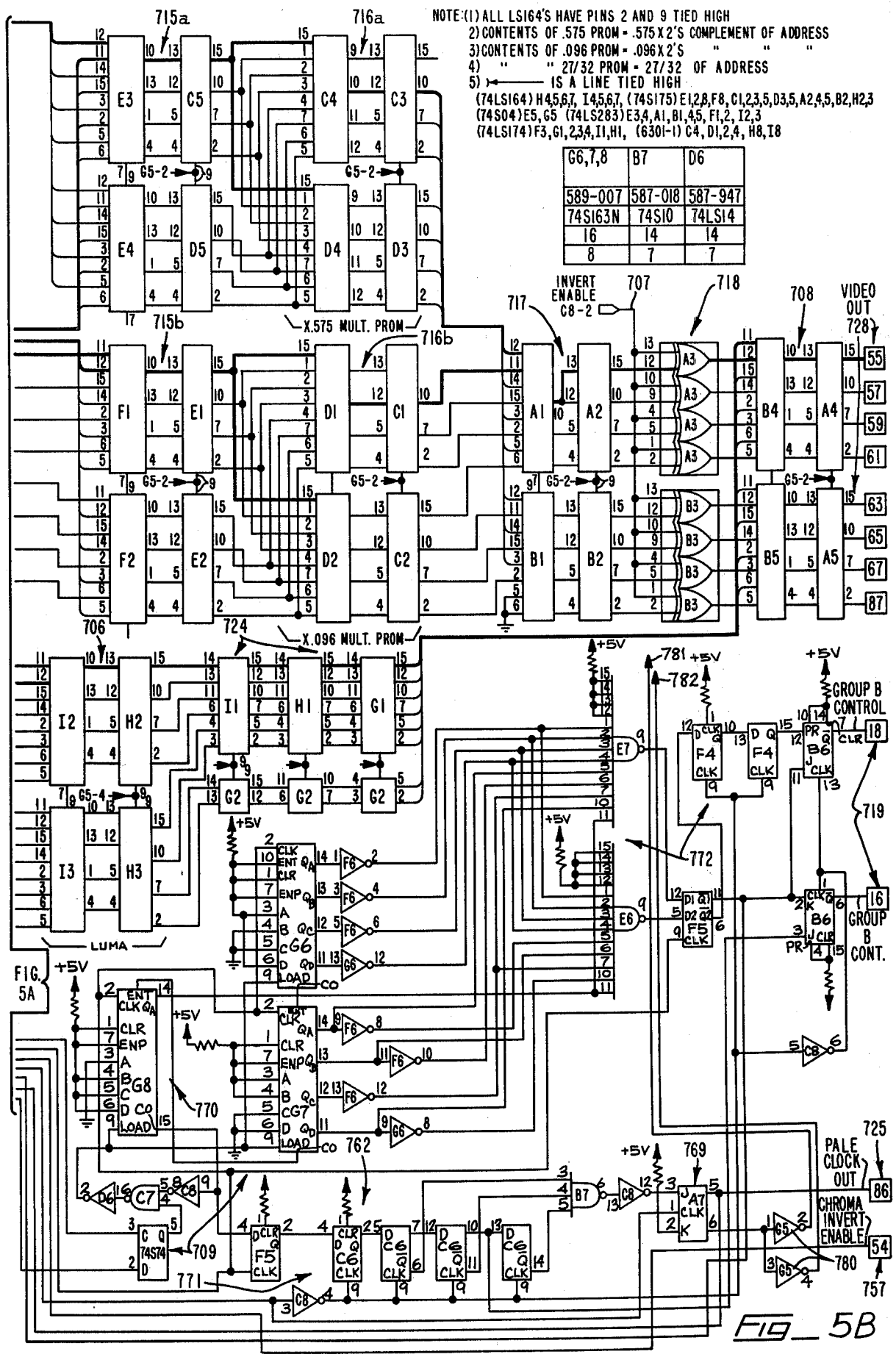

A television picture with a region of saturated color bounded along the bottom by a region of no color defines a vertical color transition along the horizontal boundary or color edge. Given three successive television lines A, B and C of a field, wherein the lines are within the saturated color region immediately above the color edge, a conventional comb filter generates the vectors representing chrominance in accordance with the relationship, $-\frac{1}{4}A + \frac{1}{2}B - \frac{1}{4}C$.

However, the color subcarrier of an NTSC television signal has a 180° phase shift between alternate lines A, B and C. Thus 180° inversion of, for example, lines A and C and subsequent summation of the vectors $+\frac{1}{4}A +\frac{1}{2}B +\frac{1}{4}C$ generates a full chrominance vector, herein termed 1B or simply, +B, the chrominance on line B. When this chrominance vector +B is subtracted from the wideband signal (which also contains the chrominance vector +B), the chrominance vectors cancel. The comb filter has effected complete chrominance and luminance separation, i.e., all chrominance is in the chrominance channel.

However, in a second case, if lines A and B are in the saturated color region, with line C in the region of no color, line A provides a chrominance vector equal to B in the negative direction and line B a vector equal to B in the positive direction. But line C provides a zero chrominance vector since it lies in a region of no color. When combining the vectors in accordance with the previous relationship, $-\frac{1}{4}$ of vector A is inverted and added to $+\frac{1}{2}$ of vector B, thereby providing a sum of $+\frac{3}{4}$ of a full vector B. It follows that when the chrominance $+\frac{3}{4}B$ is subtracted from the wideband signal, i.e., line B, there is a residual of $+\frac{1}{4}$ of the chrominance vector left in the luminance channel, while only $+\frac{3}{4}$ of the chrominance vector is extracted into the chrominance channel.

A third case exists wherein only line A is within the saturated color region, and lines B and C are in the region of no color. The third case is similar to the second case above, wherein however, the signs are opposite.

The consequence of the second (and third) case given above, wherein line C (or B and C) lies in a region of no color, prove disadvantageous when attempting to reconstitute a composite NTSC color television signal from a single stored color field, or frame. As is well known, when reproducing the composite video signal from a single stored frame, in one frame the chrominance is added directly back to the luminance previously separated therefrom, whereas in the second frame the chrominance component is first inverted and then is added to the luminance. Therefore, in the second case mentioned above wherein line C is in a region of no color, in the non-inverting frame, the $+\frac{1}{4}$ chrominance vector which remained in the luminance channel due to incomplete separation, is added to the $+\frac{3}{4}$ chrominance vector separated into the chrominance channel. Thus the full vector B, i.e., the full chrominance signal, is recovered to define a correctly reconstituted color television signal for the non-inverted frame. However, when reconstituting the second frame of color video from the single stored frame, the chrominance ($+\frac{3}{4}B$) is first inverted, providing a $-\frac{3}{4}$ chrominance vector, when when subsequently added to the $+\frac{1}{4}$ vector in the luminance channel provides only a $-\frac{1}{2}$ chrominance vector for the inverted frame. Thus, in the non-inverted frame, the chrominance is reproduced with full saturation, whereas in the alternate, inverted frame the chrominance is reproduced at $\frac{1}{2}$ saturation. Thus the color saturation defining the color edge between the region of full color and that of no color will flicker at a 15 Hz rate between $\frac{1}{2}$ saturation and full saturation. This visible flicker is objectionable when reproducing the composite NTSC four-field color coded television signal.

The chrominance separating and processing system provides various embodiments of digital circuits which perform the inversion process digitally in combination with a digital comb filter and digital bandpass filter, while further providing a conditioned chrominance signal which, when digitally re-combined to form the composite NTSC color television signal, minimizes or cancels completely the objectionable 15 Hz flicker at the vertical transitions.

Although the invention combination is hereinafter particularly described utilizing a three times subcarrier (10.7) megaHertz phase alternating line encoding (PALE) sampling technique with a PCM encoded NTSC video signal, it is to be understood that other encoding techniques, sampling techniques, frequencies, etc., may be employed. Furthermore, the single lines depicting the inputs and outputs of the block diagram components are representative of digital words of selected numbers of bits, as exemplified in the detailed schematics of FIGS. 3, 4, 5 and 8.

Referring to FIG. 1, there is shown a digital chrominance separating and processing system wherein a 10.7 megaHertz (MHz) PALE PCM color video signal is introduced via input terminal 700 to digital comb filter means 701. The filter means 701 is per se generally typical of digital comb filters presently utilized in various television signal processing systems, but herein is adapted via a specific clocking technique further described hereinbelow, to separate the chrominance from the digital wideband color signal. The outputs from filter means 701 and the associated clocking techniques, include a 1H delayed wideband signal (delayed by one-horizontal-line delay period) on line (terminal) 702, and an extracted chrominance signal (with low frequency components still included) on line (terminal) 703a. The term "extracted" is herein used to define the chrominance signal which is separated into a chrominance channel, whether the separation is complete, or incomplete, as previously described with respect to case two (and three) hereinabove.

The extracted chrominance signal is fed to bandpass filter means 704 which removes vertical resolution losses due to the comb filter means, by passing only that frequency band occupied by the chrominance information. The bandpass filter means 704 is centered at 3.58 MHz (the NTSC subcarrier frequency) and has a bandwidth of, for example, 1.5 MHz.

The resulting combed chrominance signal is fed via line (terminal) 703b to a digital circuit for inverting the chrominance signal on alternate frames at the frame rate. In FIG. 1 the inverting circuit comprises a digital transversal filter with odd symmetry 705, which herein may be further identified as a practical, digital implementation of a "Hilbert" transformer. It is understood that the transversal filter 705 provides one form of inversion; i.e., employs what is theoretically known as the Hilbert transform, which is herein implemented to provide a specific form of transversal filter with odd symmetry, while further providing a digital rather than analog inversion implementation. The transversal filter of interest has the property of rotating the phase 90° of all frequencies of a selected range which herein, for example, may be two to four megaHertz.

Thus the term inversion, or inverting, is employed to define the circuitry and process of digitally conditioning the chrominance at the frame rate (or field rate if one field is used to reconstitute the four field color coded NTSC color television signal) as by phase shifting, rotating, inverting or otherwise handling the phase. Further, the successive playbacks of either a single stored field or frame is referred to generically as "alternate repetitive reproductions".

The chrominance signal is also fed to a negative input of digital adder (subtractor) means 706. The 1H delayed wideband video signal of terminal 702 is fed to the positive input of the adder means 706. The transversal filter 705 includes a control input at 707 which determines the conditioning of the chrominance signal phase. In one embodiment, for example, the transversal filter may provide a plus and then a minus 90° phase rotation of the chrominance with respect to the luminance signal in alternate repetitive reproductions. The chrominance and luminance signals are then summed in digital adder means 708 to provide the composite color television signal on output terminal 728.

Control means 709 includes various timing and clock inputs thereto which, for example, relate to the overall apparatus timing and thus originate upstream in the apparatus. In turn, the control means 709 generates specific control signals for the comb filter means 701, for the transversal filter control input 707, for the bandpass filter means 704, etc., which control signals include a PALE clock and 1H delay line, four-phase clocks, inter alia. The control means 709 and the various inputs and outputs are further shown and described in detail in FIGS. 3A–B, 5A, B and C and thus are not further described here.

Briefly, in FIG. 1, the comb filter means 701 combines the three adjacent television lines A, B, C or previous mention, and includes a pair of digital, one-horizontal-line (1H) delay lines 710, 711 and a pair of adder means 712, 713. The 10.7 MHz PALE video signal is fed to delay line 710 as well as to adder means 712. The 1H delayed signal is fed to 1H delay means 711, and to the adder means 713. The 2H delayed signal is fed to the other input of adder means 712, whose output in turn is fed to the negative input of the (subtractor) adder means 713.

The digital comb filter means 701 and digital bandpass filter means 704 exemplified in block diagram herein, generate (eight bit) digital words corresponding to the separated chrominance and 1H delayed wideband signals, and are further depicted in the schematic diagrams of FIGS. 3A–C and 4A–B. The FIGURES include an exemplary tracing of a most significant bit (MSB) path therethrough, as further described below in FIGS. 5A–B.

The combed chrominance signal is subtracted from the 1H delayed wideband video signal via the digital adder means 706, wherein the resulting combed luminance signal is fed to the digital adder means 708.

FIG. 2 shows the digital transversal filter 705 wherein the digital combed chrominance signal is fed to a series of one-sample-period delays 714a–714c, and also to the positive input of an adder means 715b. The negative input of adder means 715b is coupled to the output of the last delay 714c. The positive and negative inputs of an adder means 715a are coupled to the input and output respectively of the delay 714b. The outputs of adder means 715a, 715b are coupled to respective multiplier programmed read-only memories (PROMs) 716a, 716b, and thence to adder means 717. The latter is coupled via an inverter stage 718 to the adder means 708 of previous mention, along with the combed luminance signal from adder means 706, whereby means 708 generates the composite color television signal. The control input 707 is coupled to the inverter stage 718.

In operation, the transversal filter 705 provides digital circuits for conditioning the phase of the chrominance signal with respect to the luminance signal; i.e., for providing the digital implementation of phase inversion of the chrominance on alternate frames. to this end, the 1H delayed wideband signal, and the chrominance signal are introduced to the adder means 706 via terminals 702, 703b respectively, whereupon the resulting luminance signal is introduced to adder means 708. The chrominance signal is delayed one-sample period (e.g., 93 nanoseconds) in each of the delays 714a–714c, whereby the undelayed chrominance and the three-sample delayed chrominance are introduced to the adder means 715b, and the one-sample and two-sample delayed chrominance signals are introduced to adder means 715a. The delays 714a–714c may comprise a single stage of a shift register. The adder means 715a, 715b provide signals to multiplier PROMs 716a, 716b respectively, which perform a multiplication of the respective signals by 0.575 and 0.096 in a digital approximation of a conventional convolution operation, such as performed by a Hilbert transformer. Although three delays and two multiplications are performed in the filter 705 of FIG. 2, additional delays and corresponding multiplications may be added to more closely approach the theoretical Hilbert transform.

The resulting signals are summed via adder means 717, and the summed signal has all of its frequency components advanced 90° with respect to the luminance signal, to define the conditioned chrominance signal of previous mention. The output of adder means 717 is delivered to the adder means 708 via the inverter stage 718. During one frame the inverter means 718 has a high, or "1", introduced thereto via the control input 707 from control means 709, whereby the (eight) bits of the output word are delivered unchanged to the adder means 708. On alternate video frames the control input 707 is a low (or "0") invert enable signal. Data is represented in this device in the signed two's complement negative system where negative numbers have a "1" in the sign bit position and the magnitude is the 2's complement of its absolute value. Therefore inversion amounts to changing the sign and forming the 2's complement, via the "0" invert enable input 707. Thus the conditioned chrominance signal (which is rotated +90°) is directly added to the luminance in one frame, and is inverted and then added to luminance in the alternate frame, to provide the composite color television signal on output terminal 728. Alternately the chroma first may be rotated −90° on each frame by reversing the inputs to the adder means 715a, b and then adding directly in one frame and inverting 180° and adding in the next.

In another alternative, the transversal filter 705 may be implemented whereby during one frame the phase of the chrominance signal is advanced by 90°, and during the alternate frame is retarded by 90°, to provide in essence the 180° inversion of the frequency components between frames.

FIGS. 3A–C, 4A–B and 5A–B illustrate one schematic implementation of the embodiment of FIGS. 1 and 2 utilizing the digital transversal filter with odd symmetry 705. FIGS. 3A–C illustrate one implementation of the digital comb filter means 701, and part of the control means 709 of FIG. 1; FIGS. 4A–B illustrate one implementation of the digital bandpass filter 704; and FIGS. 5A–B illustrate one implementation of the digital transversal filter 705, signal re-combining adder means 706, 708, and the remaining circuits of the control means 709. The FIGURES also include in heavy line, a trace of the path of one bit through the combined circuits. In all FIGURES, like components of FIGS. 1 and 2 are indicated by similar numerals.

Thus, in FIG. 3A and 10.7 MHz PALE video signal is introduced via the input terminal 700 to the digital comb filter means 701. The output thereof (FIG. 3C) comprises the separated chrominance and 1H delayed wideband signals on terminals 703a and 702 respectively. The inputs at terminal 719, 725 comprise a group A and B control signals and a symmetrical PALE clock, generated in the respective portion of control means 709 of FIG. 5B, further described below. The terminals 719, 725 are coupled to a four-phase clock generator 720 of control means 709 depicted in FIGS. 3A–B. The clock generator 720 forms part of the timing circuits for clocking the shift registers which comprise the 1H digital delay lines 710, 711. The delay lines 710, 711, adder means 712, 713 and terminals 702, 703a, are interconnected via integral latching circuits 712a, 713a and 721 which conventionally temporarily store the respective digital products of the preceeding shift registers, adders, etc. Terminal 703a provides the input to the succeeding digital bandpass filter means 704 of FIGS. 4A–B, and the terminal 702 provides the input to the adder means 706 of succeeding FIG. 5B.

The delay lines 710, 711 further each include a series of two-phase shift registers 750, 751 respectively, each employing two-phase clocks, wherein the register stages are further arranged into groups 750A, 750B of delay line 710, and 751A, 751B of delay line 711. Shift register stage selectors 752A, 752B select portions of the digital word corresponding to specific clock phases of groups A, B of delay line 710, and shift register stage selectors 753A, 753B do the same for delay line 711. Wideband signal selectors 754, 755 of delay lines 710, 711 respectively, then provide selection of the digital words corresponding to the 1H and 2H delayed wideband signals, respectively.

The wideband video signal word is split, and is clocked into four bit stages of the shift registers 750A, 750B by the four-phase clocks, which are in effect, four phases of PALE clock. The stage selector 752A receives and loads the pairs of four bits in response to PALE clock, alternately from different pairs of stages of shift register 750A. Stage selector 752B does the same with shift register 750B stages. The group A stage selectors 752A unload into one (four bit) wideband signal selector 754, while the group B stage selectors 752B unload into the other (four bit) selector 754, in response to timed PALE clocks respectively. At selected times, the group B selectors are clocked, whereby the combined group A and B registers provide a total of 680 bits per television line. One NTSC horizontal television line sampled at three-times subcarrier rate will contain 682½ samples. However, as will be described in more detail hereinbelow, the clocks for the shift registers are generated and applied to the registers so that the total bits per television line output by the register for each bit line is equal to an integral number of samples. In the embodiments described herein, 680 samples per television line are clocked through the registers. The clocking of the registers is arranged so that the discarded interval of 2½ sample intervals occurs outside the active video information portion of the television line during the horizontal blanking interval.

The control circuits 720 of FIGS. 3A–B, which provide the four-phase clocks for the shift registers 750A, 750B and 751A, 751B, and which receive a symmetrical PALE clock, are further described in operation in the block diagram and clock waveforms of the combined control means 709 in FIGS. 5C–D infra, with one implementation thereof illustrated in the schematic diagrams of FIGS. 3A, 5A–B.

FIGS. 4A–B depict the bandpass filter means 704 with terminal 703a providing the incoming extracted chrominance signal from the comb filter 701 output, FIG. 3C. The combed chrominance signal from the bandpass filter means 704 is provided at terminal 703b of FIG. 4B, which forms the input to the transversal filter with odd symmetry 705 of succeeding FIGS. 5A–B. Immediately preceeding the terminal 703b is an adder/latch stage 756, wherein the latches are clocked by a chroma invert enable signal via a terminal 757. In the embodiment employing the transversal filter 705 (FIGS. 1–5), the chroma invert enable signal does not enable the clear input of the latches, and the signal into the adder/latch stage 756 appears at the terminal 703b. The PALE clock of terminal 725 couples to various inverters (FIG. 4B) to provide a plurality of clocks for the adders and latches that comprise the bandpass filter means 704. The latches are thus clocked by the PALE clock to deliver the digital output from the preceeding logic processor component (viz, the adders) to the succeeding logical processor components (also adders). The final adder/latch stage 756 of the bandpass filter means 704 delivers the combined chrominance signal.

One-horizontal-line delay lines are required to provide the comb filtering process of chrominance signal separation from a wideband signal. The delay lines, and thus the comb filter 701, must be in synchronism with the overall system timing, which inter alia is represented by the input termed PALE flag. As discussed in the co-pending application Ser. No. 763,371 above, for which the circuitry herein was constructed, PALE flag is an H/2 rate signal generated from H sync and a field index signal indicative of the first field of every two field sequence of a television signal. PALE flag is asymetrical, i.e., is of one phase during the active video signal portion of one line, and of the other phase during the blanking H sync intervals and the next line. A burst gate signal is used to control the asymmetry of the PALE flag. However, the PALE clock utilized by the instant chrominance separating and processing circuit utilizes a symmetrical PALE clock, i.e., one in which clock has alternate phases for the same time duration.

A paramount problem when attempting to reconstitute the composite color television signal from a single stored color field or frame, stems from the fact that each line of a field is of a duration equal to $227\frac{1}{2}$ cycles of subcarrier (fsc). That is, it is equal to an integral number of cycles plus one-half cycle of subcarrier time. It follows that a required condition of 1H delay lines, when they are formed of digital shift registers such as, for example, those in the comb filter means 701, is that there is an integral number of samples per line of television and thus per one horizontal line of delay.

Accordingly, the present invention provides the control means 709 which inter alia generates the symmetrical PALE clock from the overall apparatus asymmetrical PALE flag, and which, during the horizontal blanking period deletes an integral number plus one-half of subcarrier cycles, to shift by 180° with respect to previous samples at the line rate. The PALE clock thus is in the proper phase relationship with the subcarrier frequency to reconstitute the four fields required to color encode the television signal, while also being in proper timing relationship with the overall apparatus.

Accordingly, FIG. 5C depicts in block diagram the digital control means 709 shown in one schematic implementation in FIGS. 3A–B and 5A–B. FIG. 5D is a timing diagram of the waveforms generated at various points along the circuit of FIG. 5C, as well as FIGS. 3A–B, 5A–B. In FIG. 5C, inputs from the overall system include the asymmetrical PALE flag, a six-times phase continuous subcarrier frequency (6fsc), a one-half phase continuous subcarrier frequency ($\frac{1}{2}$fsc) and a field index pulse, on respective terminals 758, 759, 760 and 761. The signals are introduced to a PALE clock generator generally indicated at 762, which in turn is coupled to the four-phase generator 720 of that portion of control means 709 in FIG. 3A–B. The latter provides the four-phase clocking of the shift registers 750A–B and 751A–B, as further described below.

The PALE clock generator 762 receives the PALE flag via terminal 758, and feeds it to an exclusive OR 763. The latter is coupled to a D-type flip-flop 764, together with the $\frac{1}{2}$fsc clock from terminal 760. The exclusive OR 763 and flip-flop 764 define a gated phase detector. A D-type flip-flop 765 is coupled to flip-flop 764 and is clocked by a correction pulse 766 corresponding to the group A control signal (719), further described infra. A JK-type flip-flop 767 is coupled to pin K thereof to flip-flop 765, and is clocked by the 6fsc clock from terminal 759. The flip-flop 767 is coupled to an AND gate 768 and back to the clear pin of the flip-flop 765. The flip-flops 765, 767 and the AND gate 768 together define a gated phase corrector. AND gate 768 also receives the 6fsc clock, and is coupled in turn to a divide-by-two ($\div 2$) JK-type flip-flop 769 and to a divide-by-1365 ($\div 1365$) counter 770. The $\div 1365$ counter 770 receives the field index pulse from terminal 761, and is coupled to the $\div 2$ flip-flop 769 via a reset pulse generator means 771. As shown in FIG. 5B, the field index pulse first is reclocked to inverted 2fsc via a flip-flop stage. The counter 770 is also coupled to a count decoder 772 which generates the group A and B control signals on terminal 719. The group A control signal defines the correction pulse 766 which clocks the flip-flop 765. The output of the $\div 2$ flip-flop 769 comprises the symmetrical PALE clock which is fed back to the second input of the exclusive OR 763 to define a closed loop in the PALE clock generator 762. The PALE clock is also fed via terminal 725 to the four-phase clock generator 720 of FIGS. 5C and 3A–B, which as shown, generates the group A, B four-phase clocks.

In operation, referring to FIGS. 5C and 5D, when the chrominance separating and processing system is turned on, the counter 770 is not properly set and accordingly is reset via the reclocked field index pulse. The latter is a 30 Hz pulse which occurs on a selected field wherein sync pulses coincide with vertical interval. After reset, the PALE clock generator starts generating an initial PALE clock which resembles true PALE clock. However, the PALE clock must be in phase with the apparatus PALE flag, during the active part of a television line. That is, when PALE flag is up, the rising edge of $\frac{1}{2}$fsc is supposed to coincide with a rising edge of PALE clock, and vice versa. To this end, the (initial) PALE clock, which may resemble the waveform of either FIG. 5D–17 or 18 when the circuit is turned on, is fed back to the exclusive OR 763 together with the PALE flag. When PALE flag is high, the exclusive OR output is low when PALE clock is low. When PALE flag is low, the exclusive OR output is low when PALE clock is high. Thus the PALE clock is de-PALED to provide 3fsc which is fed to the flip-flop 764 together with $\frac{1}{2}$fsc. The flip-flop 764 compares the de-PALED signal and the $\frac{1}{2}$fsc signal (waveforms 5D–11, 16 and 17, 18). If flip-flop 764 takes the data, the PALE clock is not in phase with the PALE flag, and vice versa. Thus the exclusive OR and the flip-flop 764 provide the gated phase detection.

If the PALE clock is not in proper phase, the gated phase corrector formed of flip-flops 765, 767 and AND gate 768, deletes one cycle of the 6fsc clock to shift the phase by 180° and bring PALE clock into the proper phase relative to PALE flag. The correction pulse 766 delays the time that the detection and correction is made, i.e., during the active part of the television line where it is known that the phase is the same, thereby avoiding various undesirable properties inherent in the PALE flag during the time period around horizontal sync. The actual shift of 180° is provided when flip-flop 765 delivers a high to the flip-flop 767 which in turn introduces a low to disable the AND gate 768. The low is also immediately fed to the clear pin of flip-flop 765 to clear the latter on the succeeding 6fsc pulse. This condition indicates that PALE clock is in proper phase relation with PALE flag, i.e., that the rising edge of ½fsc coincides with the rising edge of PALE clock when PALE flag is up.

The counter 770 counts down 1365 counts of 6fsc (FIG. 5D-1) corresponding to one television line, and delivers a carryout (FIG. 5D-3) to the reset pulse generator 771 on a rising edge of 2fsc (FIG. 5D-2). The latter includes a series of D-type flip-flops which provide six counts after carryout goes low, and thus the succession of highes depicted in FIGS. 5D-4 through 8. The inverse output signals corresponding to the waveforms of FIGS. 5D-6, 8 provide the start and end of a low state to the ÷2 JK-type flip-flop 769 (FIG. 5D-9), which in turn generates the symmetrical PALE clock at 3fsc (FIG. 5D10) which appears at terminal 725.

As may be seen by comparing FIGS. 5D-10, 11, the phase of the PALE clock is shifted by 180° by deleting 2½ cycles of the phase continuous 3fsc signal. To this end, after the input to the ÷2 flip-flop 759 goes low, the rising edge of the PALE clock corresponding to the next rising edge of 6fsc stays low, as do the two following edges of PALE clock. On the following rising edge of 6fsc after the input to flip-flop 769 goes high, the PALE clock goes high, but with 180° phase shift relative to its phase during the prior line (FIG. 5d-11), thus the requirement of deleting the ½ cycle of subcarrier each television line is accomplished.

The count decoder 772 is coupled to the counter 770 and generates the group A and B control signals after a selected count, the signals being introduced via terminal 719 to the four-phase clock generator 720. The group A control signal is also fed to the gated phase corrector as pulse 766 as previously mentioned.

The four-phase clock generator 720 provides for selected timing control of the comb filter shift registers 750A-B and 751A-B, whereby the outputs thereof fulfill the requirement of generating an integral number of samples per television line, e.g., 680, utilizing the symmetrical PALE 3fsc sample clock. This circumvents a further problem caused by the integral number of subcarrier cycles plus one-half cycle per line, wherein the one-half cycle prevents proper sampling from line-to-line and must be deleted, or otherwise compensated for. To this end, the four-phase clock generator 720 includes a divide-by-four (÷4) binary counter 773 coupled to the PALE clock via terminal 725, and thence to a one-out-of-four binary decoder 774, and to the shift register stage selector 752A (and selector 753A) of previous mention in in FIGS. 3A-C. The shift register stage selectors 752A (and 752B) are coupled to the wideband selector 754 which selects digital words from shift register group A or B in response to the group A control and PALE clock from the generator 762. The binary decoder 774 data input is connected to a high, wherein the selected output equals a low, and the unselected outputs equal highs. Binary decoder 774 is coupled to a latch 775 and thence to four D-type flip-flops 776a-d. The latch 775, whose output follows its input, is coupled to PALE clock and flip-flops 776a-b are also coupled thereto via an inverter 777. The four phase clocks are generated on outputs $\phi1$, $\phi2$, $\phi3$ and $\phi4$ of the flip-flops 776a-d via inverter stages, and are shown in FIG. 5D-12 through 15. The clocks $\phi1$, $\phi2$, $\phi3$ and $\phi4$ are introduced to the shift registers 750A of 1H delay line 710, as well as to shift registers 751A of 1H delay line 711 (FIGS. 3A-C). The video input signal is introduced to the shift registers at terminals 700.

In operation, the overlapping four-phase clocks $\phi1$ - $\phi4$ (of the order of 150 nanoseconds) are applied to the multi-stage, two-phase shift registers 750A (750B) to clock successive four bit pairs into alternate stages to provide the clocking rate required, which rate the shift registers could not handle without employing the four-phase locking into alternate stages. Note that the four-phase clocks are disabled, FIGS. 5D-12-15, during the 2½ cycles of PALE clock, FIG. 5D-10, to provide the exact 1H delay. The clocks $\phi1$ - $\phi4$ are again regenerated, starting with $\phi1$, on the rising edge of the PALe clock after the 2½ cycle interval thereof. Since shift registers having a capacity of 512 bits are readily available, they are employed to provide the 680 bits corresponding to one-horizontal-line delay.

Although only the group A shift registers 750A and timing controls therefor, of the 1H delay line 710, are discussed herein, FIG. 5C further illustrates the PALE clock (line 725) and group B control signal (line 719) as coupled to the group B shift registers of comb filter 710. Like components have similar numerals, but include primes. The group B four-phase clocks $\phi1'$-$\phi4'$ are fed to the shift registers 750B and 751B. Furthermore, the 1H delay line 711 (FIG. 3C) is identical to comb filter 710 and similarly employs the PALE clock and group A and B control signals.

FIGS. 5A-B depict one digital implementation of the control means 709 of FIG. 5C, and also of the transversal filter with odd symmetry 705 of FIG. 2, the latter including terminals 703b and 702 for receiving the combed chrominance and 1H delayed wideband signals, respectively.

The various components 714-718 of the filter 705 are shown in schematic, and define means for rotating the phase of the chrominance signal +90°, whereupon inverter means 718 inverts the signal 180° in response to the control input 707. A −90° rotation may be generated by corresponding sign changes, i.e., by clocking the latches of adders 715a, 715b, with inputs that are opposite in sign to those shown in FIG. 2. Inverter means 718 is defined herein as a plurality of exclusive ORs which essentially perform the 180° inversion.

The bandpass filter inherently has a gain of 27/32, hence the gain of the wideband signal must match this gain. Therefore, in FIGS. 5A-B, the 1H delayed wideband signal is coupled to a 27/32 multiplier PROM 722 which multiplies the wideband signal by 27/32, to provide an overall gain of unity. The wideband signal is then fed through an (eight stage) delay 723, which equalizes the delays in the wideband channel with the delays in the chrominance channel caused by the bandpass filter means 704, and thence to the adder means 706. Various latches 724 are provided between the adder means 706 and 708, which provide a temporary store of the intermediate signal while clocking the luminance signal from adder means 706. The composite color television signal is provided on output terminal 728 via the adder means 708 of FIG. 5B, by combining alternate repetitive reproductions of the stored video signal.

The block diagram of the PALE clock generator 762 of FIG. 5C is shown in schematic in FIGS. 5A-B while the four-phase clock generator 720, 720' of FIG. 5C is shown in schematic in FIG. 3A-B. Since the operation of the generators 762 and 720 were described in FIG. 5C, no further explanation is required in the schematic diagrams of FIGS. 5A-B, wherein like components are identified by similar numerals.

However, in addition, FIG. 5A includes a terminal 778 for a chroma switch and a frame switch input, which originate upstream in the overall apparatus. The frame switch input is a chrominance inversion enable signal generated by comparing the phases of the system playback color burst and the continuous phase sc. When the phases differ, the frame switch input conditions the chroma circuitry for inversion. Thus the frame switch input generates the control input 707 to the transversal filter 705 in the form of the chroma invert enable signal, as further described below, which is the same chroma invert enable signal which is fed to the adder/latch stage 756 (FIG. 4B) on the terminal 757 of FIGS. 5B and 4A. As previously described in FIG. 2, the chroma invert enable is high during one frame to pass the input unchanged through the inverting exclusive ORs 718. In the alternate frame, the invert enable is low to change the sign and form the 2's complement to thus invert the chrominance. The chroma switch input of terminal 778 couples to the frame switch input via AND gate 779 and prevents the frame switch signal from enabling inversions when the apparatus is not receiving signals from the (disc/tape) storage, e.g., when the apparatus is in electronics-to-electronics mode and chrominance inversion is not desired.

Referring still to FIG. 5A-B, the PALE clock generator also provides the PALE clock on lines 781, 782 via the inverse pin of the ÷2 JK flip-flop 769 and inverters 780. The PALE clock is used conventionally to clock the various latches associated with the adder means 715a, b, the multiplier PROMs 716a, b, the one-sample delay lines 714a, b, c and the delay 723.

By way of further explanation, in FIGS. 3A-C, 4A-B, 5A-B and also 8A-B, the heavy lines beginning at terminal 700 (FIG. 3A) and ending at terminal 728 (FIGS. 5B or 8B) trace the paths of a single bit, i.e., the most significant bit (MSB) through the chrominance and wideband channels of the chrominance separating and processing system. In particular, in each operation performed by the circuitry, the heavy line represents the contribution of the MSB in that operation. Accordingly, the bit is clocked through the shift registers 750A by the four-phase clocks $\phi 1 - \phi 4$ (group A) of the four-phase clock generator 720, as well as through shift registers 750B by four-phase clocks $\phi 1' - \phi 4'$ (group B) of similar generator 720'. The bit is similarly clocked through the delay line 711, through the adder means 712, 713 and thence to the terminal 703a to define the path of the MSB in the chrominance channel, and to terminal 702 as the path of the MSB of the (1H) wideband channel.

The most significant bit of the chrominance channel is introduced to the bandpass filter means 704, FIGS. 4A-B, and the path thereof is traced through a serial plurality of delays 783a-d. The MSB of delay 783a is coupled to adder means 784a-c; delay 783b is coupled to adder means 784a and 785a; delay 783c is coupled to adder means 784b and 785b; and delay 783d is coupled to adder means 785b. The MSB path of adder means 784a couples to adder means 785a which couples to adder means 786a. The MSB of adder means 784b couples to adder means 786a, b, and adder means 784c couples to adder means 785b. Adder means 786a, b and 785b couple to the adder means 756 of previous mention, wherein the heavy line represents the path of the MSB of the combed and filtered chrominance signal via terminal 703b. The bit is clocked through the various delays and adder means (the latter by associated latches) by the PALE clock introduced on terminal 725 and via a plurality of inverters 787.

The MSB path continues on FIGS. 5A-B into the transversal filter 705, wherein the MSB of the chrominance channel is introduced via terminal 703b and the MSB of the wideband channel via terminal 702. The MSB of the chrominance and the wideband channels follows a path essentially that shown in block of the filter 705 of FIG. 2, wherein clocking therethrough is provided via the PALE clock on lines 781, 782, and the invert enable signal on line 707. The MSB of the recombined chrominance and wideband signals represents the composite video signal on terminal 728.

Figure 8B:
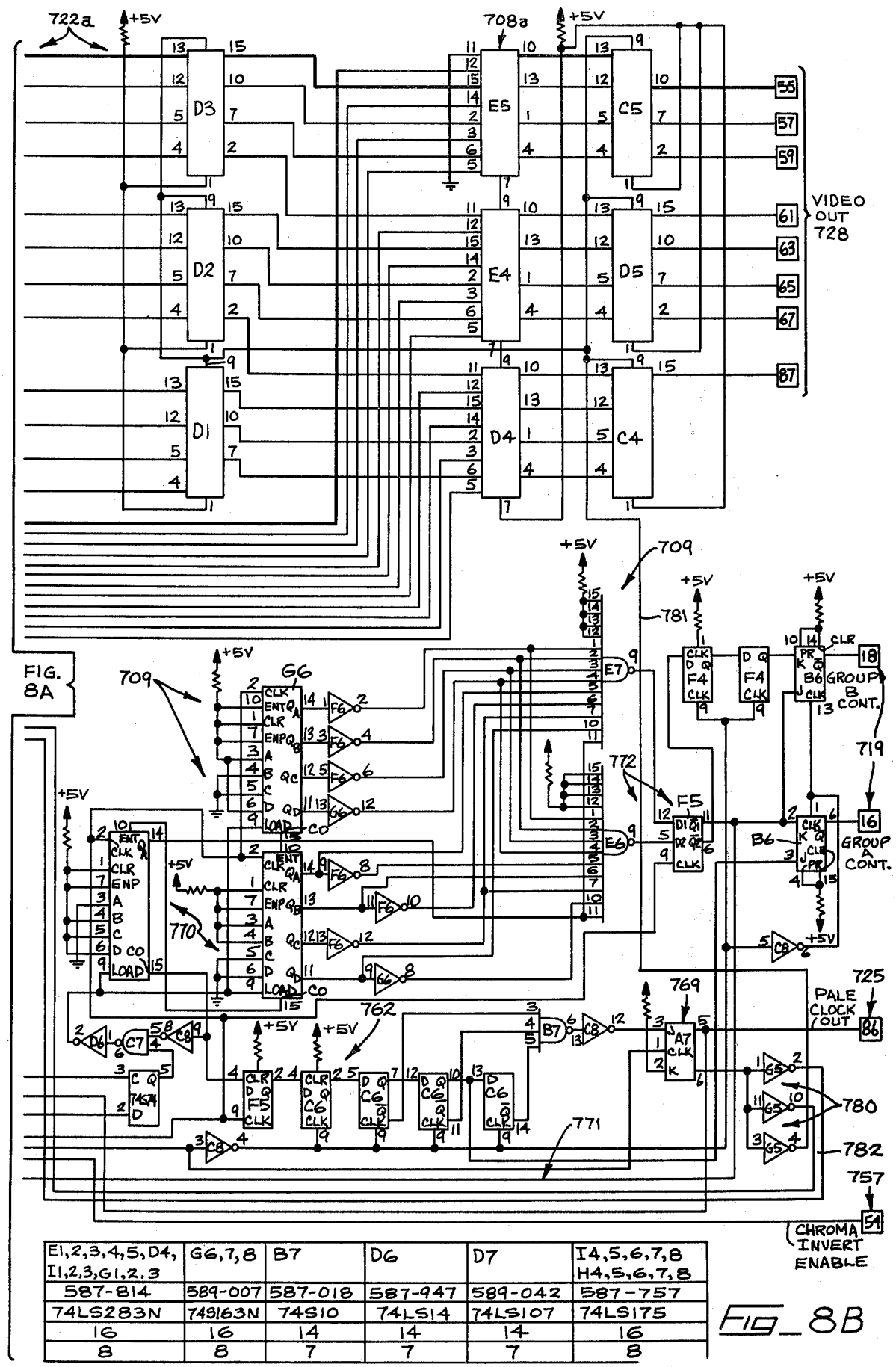

In the inverting means embodiment of FIGS. 8A-B infra, the corresponding MSB paths are introduced thereto via terminals 703b and 702, whereby the bit path is essentially that shown in block in FIG. 7 infra. Clocking of the bit through the circuit is provided via the PALE clock on lines 781, 782 and the invert enable signal on line 707b, with the MSB representing the composite video output shown in heavy line coupled to terminal 728.

Referring now to FIG. 6, there is shown an alternative embodiment of the chrominance separating and processing system, wherein like components are similarly numbered as in FIG. 1. The transversal filter 705 of FIGS. 1-5 is replaced by digital inverting means 705a, which is selectively enabled via a control input 707a thereto. In one frame the inverting means passes the incoming signal from the bandpass filter means 704 without changing it, whereas in the alternate frame the control input 707a provides an invert enable signal to the inverting means to shift the bits of the incoming digital word by 180° prior to introducing them to the adder means 708. The luminance signal derived from adder means 706 is delivered to the adder means 708, which latter means generates the composite color television signal on terminal 728, as previously described.

FIG. 7 depicts a modification of the alternative embodiment of FIG. 6, wherein adder means 706 is deleted and the inverting means 705a is replaced by inverting means 705b. Like components in the block of FIG. 7 are also similarly numbered. The inverting means 705b constitutes a digital multiply-by-two (x2) stage 756a coupled to the bandpass filter means 704, and thence to a negative input of an adder means 708a adapted to perform a subtraction process. As shown in FIGS. 8A-B, the x2 stage 756a is actually disposed at the output of the bandpass filter means 704, and corresponds to the adder/latch stage 756 of FIG. 4B. The 1H delayed wideband signal on terminal 702 is introduced to the positive input of the adder means 708a.

In operation, the x2 stage 756a is controlled via the control input 707b, i.e., the chroma invert enable signal, whereby in one frame the stage provides a zero output such that the adder means 708a reconstitutes the composite color television signal from only the 1H delayed wideband signal. On alternate frames the chroma invert enable (707b) disables the x2 stage 756a to allow passage of the digital signal to the negative input of the adder means 708a, together with the wideband signal from the comb filter means 701. The multiply-by-two process is actually performed by shifting the lines one bit, whereby subtraction of the doubled chrominance signal from the wideband signal via the adder means 708a sums the alternate repetitive reproductions to define the composite color television signal on terminal 728.

It may be seen that the system of FIG. 7 is simplified in that the adder means 706 is deleted. In any event, the systems of FIGS. 6 and 7 provide a lesser degree of conditioning of the chrominance signal on repetitive playbacks than does the system of FIGS. 1-5. Thus the systems of FIGS. 6, 7 provide full saturation of the chrominance in the non-inverted frame, with of the order of ½ saturation in the inverted frame. However, the stability improvement provided by the all-digital processing, including the inversion process, correspondingly visually improves the color edges.

FIGS. 8A-B depict in schematic the inversion means and control means therefor, for the digital chrominance separating and processing system shown in FIG. 7. To this end, the 1H delayed wideband signal is introduced from the comb filter means 701 (FIG. 3C) via terminal 702, and the bandpass filter means 704 output of the combed chrominance signal is introduced via the digital X2 stage 756a (which herein forms part of the inverting means) from the terminal 703b of FIG. 4D. To simplify the specification, the portion of the inverting means 705b corresponding to the adder/latch stage 756 of FIG. 4D, is depicted in FIG. 8A hereof, by the dashed block 756a inserted after the terminal 703b. The control input 707b, corresponds to the chroma invert enable signal of terminal 757 as previously described. Thus the latter enable signal enables the clear input of the latches of stage 756a on the non-inverting frame, to prevent passage therethrough of the signal and provide in effect the zero input from the bandpass filter to the adder means 708a. On the inverting frame, the chroma invert enable signal disables the clear input of the latches of stage 756a to pass the chrominance signal. The multiply-by-two process is conducted by shifting the wire connections to provide a bit shift of the digital word to double the chrominance signal.

The 1H delayed wideband signal is introduced to a delay 723a (FIG. 8A) similar to delay 723 of FIG. 5A, which equalizes the delays in the wideband signal with those of the chrominance signal introduced via the bandpass filter means 704. The wideband signal is then introduced to a 27/32 multiplier, 722a (FIGS. 8A-B), which performs a gain adjusting function. The wideband signal from the 27/32 multiplier 722a is introduced to the adder means 708a, along with the output from the digital X2 stage 756a. The composite video signal is provided on terminal 728 via the subtraction process conducted on alternate frames, i.e., on alternate repetitive reproductions, by adder means 708a.

As in the circuit of FIGS. 5A-b, FIGS. 8A-B include the control means 709 having the inputs 758, 759, 760 and 761, the PALE clock generator 762, and the count decoder 772, as well as the group A, B control signals on terminal 719, and the PALE clock on terminal 725. As previously mentioned, the chroma invert enable on terminal 757 is introduced to the digital X2 stage 756a. The PALE clock provided by the JK flip-flop 769 via inverters 780, is introduced via lines 781, 782 to the various latches associated with the delay 732a, the 27/32 multiplier 722a, and adder means 708a, to clock the digital signals from the preceeding logical processor component to the succeeding logical processor component, as well known in the art. The various logical elements of FIGS. 8A-B are thus essentially similar to those of FIGS. 5A-B.

FIG. 9 illustrates in block diagram a digital chrominance separating and processing system which generally functions as those previously described, but which reconstitutes the composite color television signal by repetitive reproductions of a single stored field. As in the previous figures, like components are similarly numbered. Thus the chrominance signal is separated from the color field wideband signal via comb filter means 701, and is introduced to bandpass filter means 704 via terminal 703a. The 1H delayed wideband signal is introduced to the adder means 706 via terminal 702. The combed chrominance signal is introduced via terminal 703b to an inverting means 705c, and more particularly to: a transversal filter with odd symmetry 705 similar to that of FIGS. 1-5; a third input to an electronic switch means 737; and a first input to a second electronic switch means 738. The number of the inputs of the switches corresponds to the playback number of the single field used to reconstitute the four fields of the composite color television signal. Accordingly, the output from the transversal filter 705 is coupled to a second input to the switch means 737, and to a fourth input to the switch means 738. The output from switch means 737 is coupled to an inverting means similar to 705b of FIGS. 7, 8 (or inverting means 705a of FIG. 6), which in turn is coupled to second and third inputs of switch means 738. The output of the latter is coupled to one input of the adder means 708, and the output of adder means 706 is coupled to the other input of adder means 708. Control means 709 provides switching signals via control input 707c to step the switch means 737 and 738 through the inputs thereof at the field rate, to enable the transversal filter 705 and inverting means 705b, and to control the filter means 701, 704, adder means 706, 708, etc., as described above.

As is well known, a 90° phase rotation is required between fields sine there is an integer number plus three-fourths cycles of subcarrier in a field. Thus the inverting means 705c provides shifting of the single stored field by 90° on each of four successive plays thereof, to reconstitute the four fields of the composite color television signal. To this end, on first playback of the stored field, the switch means 738 is stepped to the first input thereof, to deliver the combed chrominance signal from the bandpass filter means 704 directly to adder means 708 through switch means 738, together with the incoming luminance signal from adder means 706. The first field at 0° phase shift is thus delivered to terminal 728.

On the second playback of the stored field, switch means 737, 738 are stepped to the second inputs thereof, and the chrominance signal is delivered to the adder means 708 via the transversal filter 705, switch 737, the inverting means 705b and the second input of switch means 738. The transversal filter 705 provides a phase shift, for example, of +90° and the inverting means 705b a phase shift of 180°, to rotate the frequency components of the chrominance signal through +270°.

On the third playback of the field, switch means 737, 738 are stepped to the third inputs thereof, whereby the chrominance signal is delivered to the adder means 708 via switch means 737, the inverting means 705b and the third input of switch means 738. The chrominance signal is thus rotated +180°.

On the fourth playback, the switch means 738 is stepped to the fourth input, whereby the chrominance signal is delivered to adder means 708 via the transversal filter 705 only, to provide a +90° rotation of the chrominance signal. The four fields are combined on successive playbacks via adder means 708 to generate the composite color television signal on terminal 728.

The sign of the phase shifting may be changed, and the circuit connections and clocks thereto adapted correspondingly, whereby on the second playback of the field the transversal filter 705 rotates the chrominance −90° and is then coupled to the adder means 708. On the third playback the inverting means 705b rotates the chrominance −180°, and on the fourth playback the transversal filter 705 provides −90° rotation, and is coupled to the inverting means 705b which provides −180° rotation, wherein the combination shifts the chrominance −270°, thus providng the 90° phase shift between playbacks.

The control means 709 provides the PALE clock, the four-phase clocks, the chroma invert enable signal, etc., to the various components of the inverting means 705c, the filter means 701, 704 and to the adder means 706, 708, as described and shown in the embodiments of the previous figures.

As well known, when a composite color television signal is reconstituted from a single field, the horizontal sync pulses are not aligned on successive playbacks without the addition of one-half horizontal line delay on alternate fields. Although the chrominance processor of FIG. 9 is not directly concerned with this problem and will deliver the desired succession of fields, the use thereof would require adjunct means for detecting the vertical interval and for inserting the one-half line delay in response thereto as required, and as conventionally known in the art.

Although a 3fsc sampling rate is employed in the description above, other sampling rates may be used. For example, 4fsc, 16/5fsc, etc., may be employed. A sampling rate which provides an integral number of samples per television line is advantageous since PALE clock is not required; i.e., the PALE clock generator 762 may be omitted. Thus, the PALE clock per se is not necessary to provide the chrominance separating and processing functions herein. In addition, components such as the 27/32 multiplier and multiplier PROMS may be deleted from the systems, in the event a bandpass filter of unity gain is employed.

I claim:

1. A digital chrominance separating and processing system for enabling the digital reproduction of the four color fields of a composite color television signal from a selectively stored single frame or field, wherein the chrominance signal is incompletely extracted from the stored video as at given color edges of the video picture, the combination comprising;
    digital chrominance conditioning means for receiving the extracted chrominance and for digitally rotating the phase thereof from the nominal on alternate repetitive reproductions of the stored video, the degree of chrominance de-saturation at the color edges of the television picture being commensurate with said rotation; and
    digital recombining means for reconstituting the reproductions with blending color edges of the video picture on alternate reproductions.

2. The system of claim 1 wherein the conditioning means partially de-saturates the chrominance signal of the reproductions a selected degree by corresponding selective digital rotation of the chrominance signal.

3. The system of claim 2 wherein the phase is selectively rotated within a range of zero to 90°.

4. The system of claim 3 further including;
    means for digitally separating the luminance signal from the stored video;
    said chrominance signal being rotated relative to the luminance signal;
    said means for reconstituting including adder means for summing the luminance and the phase rotated chrominance to combine both frames of partially de-saturated chrominance with no visually noticeable saturation changes between frames.

5. The system of claim 4 wherein said digital chrominance conditioning means comprises a digital transversal filter with odd symmetry which rotates the phase of all frequency components of the chrominance signal 90° over a given range of frequencies.

6. The system of claim 5 wherein the digital transversal filter advances the phase of the chrominance signal 90° in the first frame, and retards the phase thereof 90° in the alternate frame.

7. The system of claim 5 wherein the digital transversal filter rotates the phase of the chrominance signal 90° with selected sign in the first frame, and in the alternate frame rotates the phase thereof 90° with the same sign and then inverts the phase of the latter signal by 180°.

8. The system of claim 5 wherein said digital transversal filter further includes;
    at least three serially coupled one-sample period delays;
    first subtractor means coupled across the first and last one-sample delays;
    second subtractor means coupled after the first and before the last one-sample delay;
    multiplier means coupled to respective subtractor means;
    adder means coupled to the multiplier means for generating a chrominance signal selectively rotated 90°; and
    inverting stage means coupled to the adder means for passing the selectively rotated chrominance signal in the first frame, and for inverting the signal 180° in an alternate frame, said combining means being coupled to the inverting stage means and to the luminance signal.

9. The system of claim 1 wherein the time period is equal to a color frame and the phase is rotated within a range of zero to 180°.

10. The system of claim 9 further including;
    digital filter means for receiving the stored video signal and for digitally separating the chrominance signal therefrom;
    said digital chrominance conditioning means being coupled to the filter means for digitally rotating the phase of the extracted chrominance signal selectively from the nominal during alternate frames to optimize the degree of desaturation thereof at said color edges where incomplete chrominance separation occurs; and
    digital combining means coupled to the conditioning means for digitally reconstituting the successive frames of the composite color television signal to visually optimize the de-saturated chrominance at the color edges.

11. The system of claim 10 wherein;
    said digital filter means includes means for providing a one horizontal line delayed wideband signal;
    said chrominance conditioning means comprises a digital multiply-by-two means coupled to the bandpass filter for providing no output therefrom in the first non-inverted frame, and for digitally doubling the chrominance signal prior to passing same in the alternate inverted frame; and said combining means comprises subtractor means which passes the wideband signal in the non-inverted frame, and subtracts the doubled chrominance signal from the wideband signal in the inverted frame.

12. The system of claim 11 including;
means for generating an invert enable signal;
wherein the digital multiply-by-two means includes latching means responsive to the presence and absence of the invert enable signal to enable and disable the output thereof on successive frames, and wire connections shifted by one bit to provide the chrominance doubling process.

13. The system of claim 10 wherein;
said ditital filter means includes a digital comb filter for separating the chrominance signal, and a digital bandpass filter coupled to the comb filter for passing the frequency band occupied by the chrominance information;
digital means coupled to the comb filter and the bandpass filter for digitally separating a luminance signal from the stored video signal;
said conditioning means comprises digital inverting means for selectively rotating the phase of the chrominance relative to the luminance signal to generate the selected de-saturation; and
said combining means digitally re-constitutes the chrominance and luminance within the composite color television signal.

14. The system of claim 13, wherein;
said inverting means comprises a digital inverter circuit for passing the chrominance signal from the bandpass filter in the first frame, and inverting the chrominance signal by 180° prior to passing same in the alternate frame; and
said combining means is coupled to receive the non-inverted and inverted chrominance signals, and the luminance signal.

15. The system of claim 13 wherein;
said inverting means comprises a digital transversal filter with odd symmetry which rotates the phase of all frequency components of the chrominance signal 90° with respect to the luminance signal over a given range of frequencies; and
said digital combining means is disposed to receive the chrominance and the luminance signals.

16. The system of claim 15 wherein said digital transversal filter advances the phase of the chrominance signal 90° in the first frame, and retards the phase thereof 90° in the alternate frame.

17. The system of claim 15 wherein said digital transversal filter advances the phase of the chrominance signal in the first frame, and in the alternate frame advances the phase thereof 90° and then inverts the phase of the latter signal by 180°.

18. The system of claim 15 wherein said digital transversal filter retards the phase of the chrominance signal 90° in the first frame, and in the alternate frame retards the phase thereof 90° and then inverts the phase of the latter signal by 180°.

19. The system of claim 1 wherein the time period is equal to a field, wherein the chrominance signal is selectively rotated 90° in each of the successive four playbacks of the stored field.

20. The system of claim 19 wherein the stored video signal is formed of single fields;
said digital inverting means further includes a digital inverter circuit, and a digital transversal filter with odd symmetry, selectively coupled with respect to the chrominance signal on successive fields to effect the 90° phase rotation therebetween on four successive playbacks of the field.

21. The system of claim 20 wherein;
the digital transversal filter is coupled to the bandpass filter; and
the circuit further includes digital switch means selectively intercoupling the chrominance signal with respect to the transversal filter and the inverter circuit to provide the four playbacks of the stored field with the 90° phase rotation of the chrominance signal in the successive playbacks.

22. The system of claim 21 wherein the digital switch means further includes;
a first digital switch having switch inputs numbers two and three and coupled at its output to the inverter circuit;
a second digital switch having switch inputs one, two, three and four and coupled at its output to the digital combining means;
said inverter circuit being connected to the number two and three inputs of the second digital switch;
wherein in the first playback of the stored field, the number one input of the digital switch is coupled directly to the bandpass filter to pass the chrominance signal to the combining means with zero phase rotation;
in the second playback of the field, the number two input of the first digital switch is coupled between the transversal filter and the number two input of the second digital switch via the inverter circuit to rotate the chrominance +270°;
in the third playback, the number three input of the first digital switch is coupled to the third input of the second digital switch via the inverter circuit to rotate the chrominance +180°; and
in the fourth playback, the number four input of the second digital switch is coupled to the transversal filter to rotate the chrominance +90°, thereby providing the four fields of the composite color television signal.

23. The system of claim 22 wherein the first and second digital switches are intercoupled to provide phase rotations of zero, −90°, −180°, −270° for the four playbacks respectively of the stored field.

24. A process for digitally reproducing both frames of a composite color television signal from a signal stored field or frame, wherein the chrominance signal has been incompletely extracted from the stored video signal at the vertical transitions of the television picture, comprising the steps of;
digitally conditioning the phase of the extracted chrominance signal to provide a selected condition of chrominance desaturation in given reproduced frames of the composite color television signal at said vertical transitions of the picture; and
digitally re-combining the frames to generate the composite color television signal with visually improved variation in chrominance saturation at the vertical transitions of the television picture.

25. The process of claim 24 wherein the step of digitally conditioning further includes;

digitally rotating the phase of the chrominance signal selectively from the nominal during playback to optimize the degree of chrominance de-saturation at the vertical transitions.

26. The process of claim 25 wherein the phase is digitally rotated 0° in one frame and 180° on the alternate frame.

27. The process of claim 25 wherein the phase is rotated +90° in one frame, and −90° in the alternate frame.

28. The process of claim 25 wherein the phase is rotated 90° with selected sign in one frame, and in the alternate frame is rotated 90° with the selected sign and then inverted 180°.

29. The process of claim 25 further including;
providing a one horizontal line delayed wideband signal;
wherein the step of digitally rotating includes;
passing the wideband signal in one frame;
doubling the chrominance signal in the alternate frame; and
subtracting the doubled chrominance signal from the wideband signal during the alternate frame.

30. In a digital chrominance separating and processing system for digitally reproducing a composite color television signal from a selectively stored single frame or field, including filter means for separating the chrominance signal from the stored video, and re-combining means for reconstituting the composite color television signal, the improvement comprising;
digital circuit means for digitally effecting an inversion of the separated chrominance on alternate repetitive reproductions of the stored video.

31. The system of claim 30 wherein the digital circuit means digitally rotates te chrominance during selected repetitive reproductions to effect said inversion.

32. The system of claim 31 wherein the digital rotation in selected reproductions defines a predetermined chrominance de-saturation commensurate with a visual likeness between frames at said color edges.

* * * * *